US009749433B2

(12) United States Patent
Allen et al.

(10) Patent No.: US 9,749,433 B2
(45) Date of Patent: *Aug. 29, 2017

(54) ADJUSTING PROMINENCE OF A PARTICIPANT PROFILE IN A SOCIAL NETWORKING INTERFACE

(71) Applicant: INTERNATIONAL BUSINESS MACHINES CORPORATION, Armonk, NY (US)

(72) Inventors: Corville O. Allen, Morrisville, NC (US); Bernadette A. Carter, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 142 days.

This patent is subject to a terminal disclaimer.

(21) Appl. No.: 14/556,080

(22) Filed: Nov. 28, 2014

(65) Prior Publication Data

US 2015/0205794 A1 Jul. 23, 2015

Related U.S. Application Data

(63) Continuation of application No. 14/161,681, filed on Jan. 22, 2014.

(51) Int. Cl.
*G06F 15/16* (2006.01)
*H04L 29/08* (2006.01)
(Continued)

(52) U.S. Cl.
CPC ............ *H04L 67/22* (2013.01); *G06F 17/272* (2013.01); *G06F 17/30867* (2013.01);
(Continued)

(58) Field of Classification Search
None
See application file for complete search history.

(56) References Cited

U.S. PATENT DOCUMENTS 8,370,282 B1* 2/2013 Leung ............... G06F 17/30247
706/20
9,325,823 B2* 4/2016 Felt .................. H04M 1/27455
(Continued)

OTHER PUBLICATIONS

McCord, M.C. et al. Deep parsing in Watson. IBM J. Res. & Dev. vol. 56 No. 3/4 Paper 3 May/Jul. 2012. pp. 3:1-3:15. International Business Machines Corporation, Yorktown Heights, NY.
(Continued)

*Primary Examiner* — Viet Vu
*Assistant Examiner* — James Edwards
(74) *Attorney, Agent, or Firm* — The Steadman Law Firm PLLC

(57) ABSTRACT

An approach is described for adjusting prominence of a participant profile in a social networking interface. An associated method may include receiving an activity stream update of the participant and calculating a relevancy score based on content in the activity stream update. The method further may include adjusting a visibility level of the profile of the participant in the social networking interface based upon the calculated relevancy score. Adjusting the visibility level may include increasing the visibility level of the profile of the participant upon determining that the calculated relevancy score is greater than or equal to a first predefined threshold value. Adjusting the visibility level further may include decreasing the visibility level of the profile of the participant upon determining that calculated relevancy score of the participant is less than a second predefined threshold value.

15 Claims, 14 Drawing Sheets

(51) Int. Cl.
*G06F 17/27* (2006.01)
*G06T 11/00* (2006.01)
*G06Q 10/10* (2012.01)
*G06Q 50/00* (2012.01)
*G06F 17/30* (2006.01)

(52) U.S. Cl.
CPC ............ *G06Q 10/10* (2013.01); *G06Q 50/01* (2013.01); *G06T 11/001* (2013.01); *H04L 67/306* (2013.01); *G06F 17/30* (2013.01); *H04N 2201/325* (2013.01)

(56) References Cited

U.S. PATENT DOCUMENTS

| | | | | |
|---|---|---|---|---|
| 2003/0088687 | A1* | 5/2003 | Begeja | H04N 7/17318 709/231 |
| 2005/0041871 | A1* | 2/2005 | Abe | G06T 7/0085 382/199 |
| 2007/0132572 | A1* | 6/2007 | Itoh | B60K 35/00 340/462 |
| 2007/0280504 | A1* | 12/2007 | Badawy | G06K 9/00711 382/104 |
| 2008/0129757 | A1* | 6/2008 | Tanaka | G06F 3/0482 345/660 |
| 2009/0319940 | A1* | 12/2009 | Flake | H04L 41/22 715/781 |
| 2010/0114887 | A1* | 5/2010 | Conway | G06F 3/0237 707/737 |
| 2011/0066949 | A1* | 3/2011 | DeLuca | G06Q 10/10 715/744 |
| 2011/0128301 | A1* | 6/2011 | Kimura | H04N 1/00323 345/660 |
| 2011/0225170 | A1 | 9/2011 | Obasanjo et al. | |
| 2011/0258540 | A1* | 10/2011 | Ueda | G06F 17/30011 715/273 |
| 2011/0321095 | A1* | 12/2011 | Yao | H04N 21/235 725/41 |
| 2012/0047147 | A1* | 2/2012 | Redstone | G06F 17/3087 707/748 |
| 2012/0158843 | A1* | 6/2012 | Angani | G06Q 50/01 709/204 |
| 2013/0046826 | A1* | 2/2013 | Stanton | G06Q 10/10 709/204 |
| 2014/0025692 | A1* | 1/2014 | Pappas | G06F 17/30867 707/754 |
| 2014/0281847 | A1* | 9/2014 | Marra | G06F 17/212 715/202 |
| 2015/0082181 | A1* | 3/2015 | Ames | G06F 3/04815 715/738 |
| 2015/0127727 | A1* | 5/2015 | Tseng | H04L 65/403 709/204 |

OTHER PUBLICATIONS

Guy, Ido et al. Personalized Activity Streams: Sifting through the "River of News". RecSys '11 Proceedings of the fifth ACM conference on Recommender systems, Oct. 23-27, 2011, Chicago, IL. pp. 181-188. ACM, New York, NY.

Guy, Ido et al. Swimming against the Streamz: Search and Analytics over the Enterprise Activity Stream. CIKM2012: The 21st ACM International Conference on Information and Knowledge Management 2012, Oct. 29-Nov. 2, 2012, Maui, HI. pp. 1587-1591. ACM, New York, NY.

Guy, Ido et al. Finger on the Pulse: The Value of the Activity Stream in the Enterprise. Human-Computer Interaction—INTERACT 2013, 14th IFIP TC 13 International Conference, Cape Town, South Africa, Sep. 2-6, 2013, Proceedings, Part IV. pp. 411-428. Springer Berlin Heidelberg.

* cited by examiner

ADJUSTING PROMINENCE OF A PARTICIPANT PROFILE IN A SOCIAL NETWORKING INTERFACE

BACKGROUND

The various embodiments described herein generally relate to social networking applications. More specifically, the various embodiments describe techniques of adjusting prominence of a participant profile in a social networking interface.

Social networking applications often include large networks of participants. For instance, numerous participants may post activity updates in one or more activity streams of a social network. A client social networking interface may include a participant identification section having a profile for each of a group of participants interacting with the client. The profile for each participant may include one or more identifiers, such as a thumbnail image. While activity updates of certain participants may be of particular interest to the client, the social networking interface may display participant profiles based primarily on timing or frequency of activity stream updates rather than the relevancy of such updates with respect to the client.

Accordingly, depending on the activity of the various participants, the social networking interface may prominently display profiles of participants for which the client has relatively little interest, especially if such participants have posted recently or post often. Furthermore, the social networking interface may obscure profiles and updates of participants for which the client has particular interest, especially if such participants have not posted recently or post rarely. Consequently, visibility levels of participant profiles in the social network interface may not be consistent with client needs or preferences.

SUMMARY

The various embodiments of the invention provide techniques for adjusting participant prominence in a social networking application. One embodiment includes a method of adjusting prominence of a profile of a participant among a plurality of participants in a social networking interface of a client. The method may include receiving an activity stream update of the participant and calculating a relevancy score based on content in the activity stream update of the participant. The method further may include adjusting a visibility level of the profile of the participant in the social networking interface based upon the calculated relevancy score.

In an embodiment, adjusting the visibility level of the profile of the participant may include increasing the visibility level of the profile of the participant upon determining that the calculated relevancy score is greater than or equal to a first predefined threshold value. Furthermore, adjusting the visibility level of the profile of the participant may include decreasing the visibility level of the profile of the participant upon determining that calculated relevancy score is less than a second predefined threshold value. Increasing the visibility level of the profile of the participant may include at least one of increasing size of a thumbnail image of the participant in the social networking interface, increasing degree of color intensity of a border around the thumbnail image of the participant, and increasing size of the border around the thumbnail image of the participant. Conversely, decreasing the visibility level of the profile of the participant may include at least one of decreasing size of the thumbnail image of the participant, decreasing degree of color intensity of the border around the thumbnail image of the participant, and decreasing size of the border around the thumbnail image of the participant. Furthermore, the second predefined threshold value may be equal to the first predefined threshold value.

In an embodiment, calculating the relevancy score may include initializing the relevancy score with a predefined baseline value, facilitating parsing of language in the activity stream update of the participant to determine one or more terms associated with the activity stream update of the participant, facilitating parsing of language associated with the client to determine one or more terms associated with the client, and adjusting the relevancy score by iteratively comparing the one or more terms associated with the activity stream update of the participant and the one or more terms associated with the client.

According to such embodiment, adjusting the relevancy score may include increasing the relevancy score by a first predefined amount upon determining a direct match relationship between a term among the one or more terms associated with the activity stream update of the participant and a term among the one or more terms associated with the client. Moreover, adjusting the relevancy score may include increasing the relevancy score by a second predefined amount upon determining a synonymous relationship between a term among the one or more terms associated with the activity stream update of the participant and a term among the one or more terms associated with the client. The second predefined amount may be less than the first predefined amount. Furthermore, adjusting the relevancy score may include increasing the relevancy score by a third amount upon determining an ontological relationship between a term among the one or more terms associated with the activity stream update of the participant and a term among the one or more terms associated with the client. The third amount may be less than the second predefined amount, and magnitude of the third amount may be determined via ontological analysis. Optionally, adjusting the relevancy score may include decreasing the relevancy score by a fourth predefined amount upon determining no relationship between a term among the one or more terms associated with the activity stream update of the participant and a term among the one or more terms associated with the client, and upon further determining that the participant has posted a threshold number of activity stream updates within a predefined duration of time.

In a further embodiment, calculating the relevancy score may include initializing the relevancy score with a predefined baseline value, determining one or more content types associated with the activity stream update of the participant, determining one or more content types associated with the client, and adjusting the relevancy score by iteratively comparing the one or more content types associated with the activity stream update of the participant and the one or more content types associated with the client. According to such embodiment, adjusting the relevancy score may include increasing the relevancy score by a predefined amount upon determining a match between a content type among the one or more content types associated with the activity stream update of the participant and a content type among the one or more content types associated with the client.

In a further embodiment, calculating the relevancy score may include initializing the relevancy score with a predefined baseline value, facilitating parsing of language in the activity stream update of the participant to determine one or more actionable tasks associated with the activity stream update of the participant, facilitating parsing of language associated with the client to determine one or more actionable tasks associated with the client, and adjusting the relevancy score by iteratively comparing the one or more actionable tasks associated with the activity stream update of the participant and the one or more actionable tasks associated with the client. According to such embodiment, the method further may include including natural language of the activity stream update of the participant in a caption adjacent to the thumbnail image of the participant in the social networking interface upon determining that the relevancy score exceeds an actionable task threshold value.

An additional embodiment includes a computer program product including a computer readable storage medium having program instructions embodied therewith, wherein the program instructions may be executable by a computing device to cause the computing device to perform one or more steps of above recited method. A further embodiment includes a system having a processor and a memory storing a content management application program, which, when executed on the processor, performs one or more steps of the above recited method.

BRIEF DESCRIPTION OF THE SEVERAL VIEWS OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
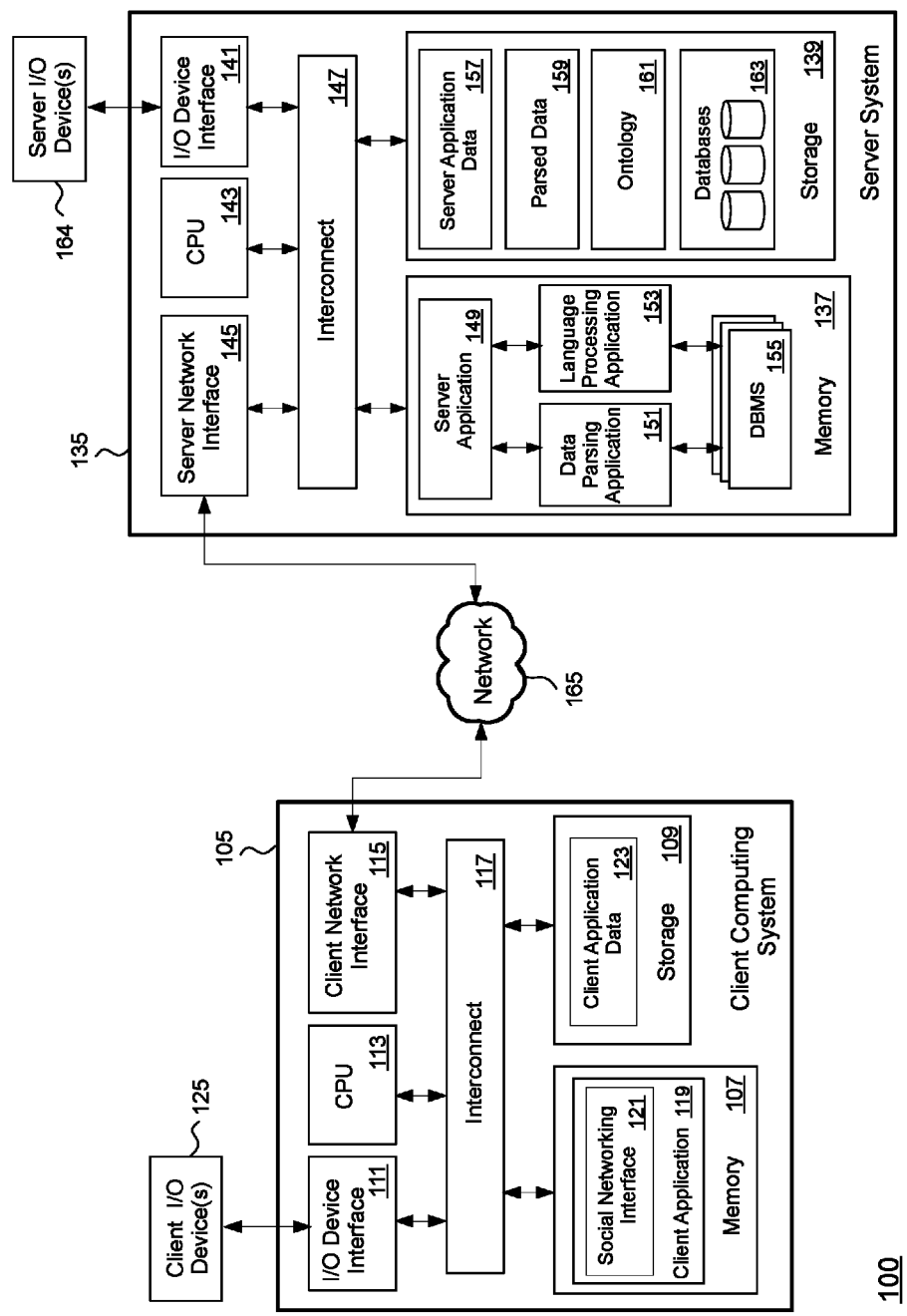
FIG. 1 illustrates a computing infrastructure, according to an embodiment.

The various embodiments of the invention described herein are directed to techniques for adjusting prominence of a participant profile in a social networking interface of a client based on an activity stream update of the participant. A technique for adjusting prominence of the participant profile may include calculating a relevancy score for the participant based on content in the activity stream update and then adjusting visibility level of the participant profile. In an embodiment, the participant profile may be included with other participant profiles in a participant identification section of the client social networking interface. Furthermore, the participant profile may include one or more identifiers, such as a thumbnail image.

According to one embodiment, a client social networking application may calculate and adjust the relevancy score by iteratively comparing one or more terms associated with the participant activity stream update and one or more terms associated with the client. The one or more terms associated with the participant activity stream update may be parsed from language of the update. The one or more terms associated with the client may be parsed from language derived from at least one of client activity stream updates and client profile information (e.g., client interests). In such embodiment, the client application may initialize the relevancy score with a baseline value and then may increase the relevancy score each time a relationship is determined between a respective term associated with the participant activity stream update and a respective term associated with the client. As further described herein, the amount of such increase may depend upon the nature of the determined relationship. Optionally, according to such embodiment, the client application may decrease the relevancy score upon determining that no relationship exists between a term associated with the participant activity stream update and a term associated with the client and upon further determining that the participant has posted a predefined number of activity stream updates within a predefined duration of time.

According to a further embodiment, the client social networking application may calculate and adjust the relevancy score by iteratively comparing one or more content types associated with the participant activity stream update and one or more content types associated with the client. Content types according to this disclosure may include at least one of application instances, Internet hyperlinks, and audiovisual resources. The client application may determine the one or more content types associated with the client from at least one of client activity stream updates and client profile information. In such embodiment, the client application may initialize the relevancy score with a baseline value and then may increase the relevancy score by a predefined amount each time a match is determined between a respective content type associated with the participant activity stream update and a respective content type associated with the client.

According to a further embodiment, the client social networking application may calculate and adjust the relevancy score by iteratively comparing one or more actionable tasks associated with the participant activity stream update and one or more actionable tasks associated with the client. An actionable task in the context of this disclosure refers to an action verb and one or more associated objects. The one or more actionable tasks associated with the participant activity stream update may be parsed from language of the update. The one or more actionable tasks associated with the client may be parsed from language derived from at least one of client activity stream updates and client profile information (e.g., client interests). In such embodiment, the client application may initialize the relevancy score with a baseline value and then may increase the relevancy score each time a relationship is determined between a respective actionable task associated with the participant activity stream update and a respective actionable task associated with the client. As further described herein, the amount of such increase may depend upon the nature of the determined relationship.

The client application may adjust the visibility level of the participant profile based on the calculated relevancy score. According to one embodiment, the client application may increase the visibility level of the participant profile upon determining that the calculated relevancy score is greater than or equal to a first predefined threshold value. Furthermore, the client application may decrease the visibility level of the participant profile upon determining that calculated relevancy score of the participant is less than a second predefined threshold value. In an embodiment, the second predefined threshold value may be equal to the first predefined threshold value.

In an embodiment, the client application may adjust visibility level of the participant profile by adjusting one or more identifiers associated with the participant in the participant identification section of the client social networking interface. Specifically, the client application may increase the visibility level of the participant profile by performing at least one of increasing size of a thumbnail image of the participant in the participant identification section, increasing degree of color intensity of a border around the thumbnail image, and increasing size of the border around the thumbnail image. Conversely, the client application may decrease the visibility level of participant profile by performing at least one of decreasing size of the thumbnail image, decreasing degree of color intensity of a border around the thumbnail image, and decreasing size of the border around the thumbnail image.

The various embodiments of the invention described herein may have various advantages over a conventional social networking application interface. While a conventional social networking application may determine prominence of a participant profile primarily based on how recently or frequency such participant posts activity stream updates, a social networking application according to the various embodiments described herein may determine prominence of the participant profile based on the relevance of activity stream updates of the participant with respect to the client. By determining prominence of the participant profile based on relevance, the visibility level of the participant profile in the social network interface may be aligned more closely with client needs or preferences.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in the cloud, without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of this disclosure, workloads of a client computing system or server system running a social networking application according to the various embodiments described herein may be deployed to a computing cloud. Moreover, cloud-based database systems, virtual machines, and a variety of other server applications may be used to manage such workloads.

Further, particular embodiments describe techniques for adjusting prominence of a participant profile in a social networking interface. However, it should be understood that the techniques described herein may be adapted to a variety of purposes in addition to those specifically described herein. Accordingly, references to specific embodiments are included to be illustrative and not limiting.

FIG. 1 illustrates a social networking computing infrastructure 100 according to an embodiment. As shown, computing infrastructure 100 includes a client computing system 105 and a server system 135, each connected to a communications network 165.

Illustratively, client computing system 105 may include a memory 107, storage 109, input/output (I/O) device interface 111, a central processing unit (CPU) 113, and a client network interface 115, all of which may be interconnected via interconnect 117 (e.g., a bus). Although shown as a single computing system, client computing system 105 is included to be representative of a single client or multiple clients. In an embodiment, client computing system 105 may be a thin client. Memory 107 may include a client social networking application 119. Client social networking application 119 may include a social networking interface 121. Storage 109 may include client application data 123 associated with client social networking application 119. I/O device interface 111 may be communicatively coupled to one or more client I/O devices 125. CPU 113 is included to be representative of a single CPU, multiple CPUs, a single CPU having multiple processing cores, and the like. Client network interface 115 may receive data from and transmit data to server system 135 via network 165.

Server system 135 may include a memory 137, storage 139, I/O device interface 141, a CPU 143, and a server network interface 145, all of which may be interconnected via interconnect 147 (e.g., a bus). Memory 137 may include a server social networking application 149, a data parsing application 151, a language processing application 153, and a database management system (DBMS) 155. DBMS 155 is included be representative of a single database system or multiple database systems. Storage 139 may include server social networking application data 157, parsed data 159, ontology 161, and databases 163. Server social networking application 149 may generate and process server social networking application data 157 based on interaction with client computing system 105. To address social networking requests of client computing system 105, server social networking application 149 may send such requests to data parsing application 151 or language processing application 153. Data parsing application 151 may send database requests to DBMS 155, and data parsing application 151 may process results returned by DBMS 155 to generate parsed data 159. Additionally, language processing application 153 may send requests to DBMS 155 or to ontology 161 to determine one or more language relationships. DBMS 155 may include a software application configured to manage databases 163. Ontology 161 may include one or more ontology trees or other ontological structures. Databases 163 may include one or more relational databases. While FIG. 1 illustrates three databases 163, computing infrastructure 100 may include any number of databases. According to an embodiment, DBMS 155 may send requests to remote databases (not shown) via network 165.

I/O device interface 141 may be communicatively coupled to one or more server I/O devices 164. CPU 143 is included to be representative of a single CPU, multiple CPUs, a single CPU having multiple processing cores, and the like. Server network interface 145 may receive data from and transmit data to client computing system 105 via network 165. Specifically, server social networking application 149 may accept requests sent by client computing system 105 to server system 135 and may transmit data to client computing system 105 via server network interface 145.

Figure 2:
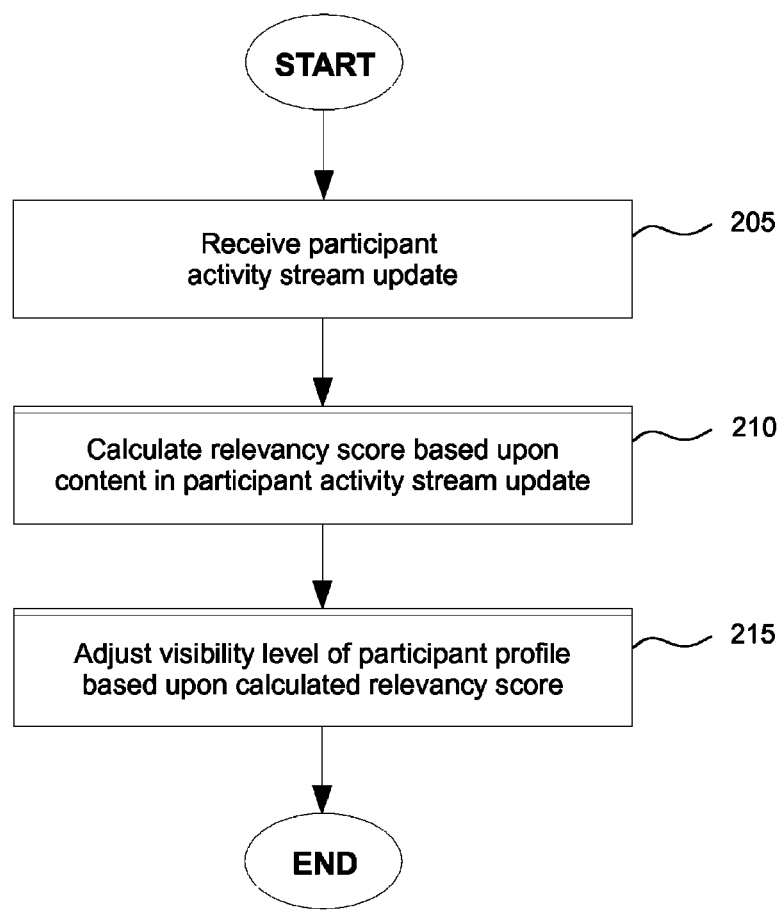
FIG. 2 illustrates a method of adjusting prominence of a profile of a participant among a plurality of participants in a social networking interface, according to an embodiment.

FIG. 2 illustrates a method 200 of adjusting prominence of a profile of a participant among a plurality of social networking participants in a client social networking interface (e.g., social networking interface 121), according to an embodiment. The social networking interface may be part of a client social networking application (e.g., client social networking application 119) running on a client computing system (e.g., client computing system 105). For purposes of this disclosure, a user of the client computing system is referred to as a client.

The method 200 may begin at step 205, where the client application may receive an activity stream update of the participant. The activity stream update may be transmitted to the client application via a network (e.g., network 165) by a server system (e.g., server system 135) running a server social networking application interacting with the client application (e.g., server social networking application 149). Furthermore, the client application may display the activity stream update in the client social networking interface. At step 210, the client application may calculate a relevancy score for the participant based upon content in the participant activity stream update. Techniques for calculating and adjusting the relevancy score according to step 210 are described herein with respect to FIGS. 3-7. At step 215, the client application may adjust visibility level of the participant profile in the social networking interface based upon the calculated relevancy score. A technique for adjusting visibility level of the participant profile is further described herein with respect to FIG. 8.

Figure 3:
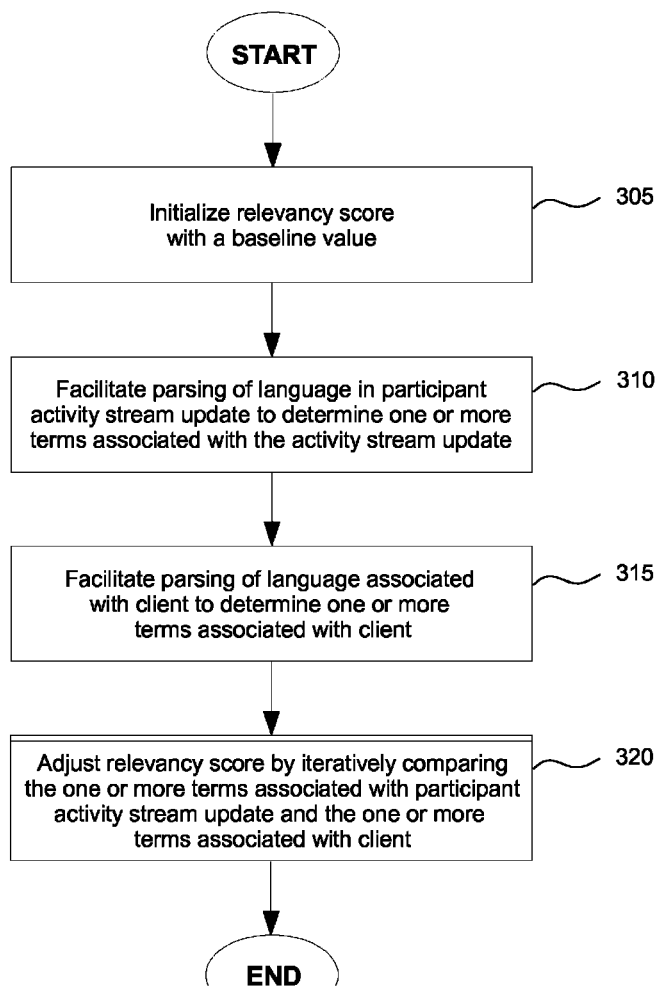
FIG. 3 illustrates a method of calculating a relevancy score based upon content in an activity stream update, according to an embodiment.

FIG. 3 illustrates a method 300 of calculating the relevancy score based upon content in the activity stream update of the participant. The method 300 provides an embodiment with respect to step 210 of the method 200. The method 300 may begin at step 305, where the client application may initialize the relevancy score with a baseline value. The baseline value may be a default value (e.g., 0) that may be modified based upon content in the participant activity stream update.

At step 310, the client application may facilitate parsing of language in the participant activity stream update to determine one or more terms associated with the activity stream update. Specifically, the client application may send language in the participant activity stream update to a data parsing application (e.g., data parsing application 151) running on the server system to determine the one or more terms. The data parsing application may include a slot grammar parser. To address multiple languages, such slot grammar parser may include both a language-universal shell and language-specific grammars for certain languages (e.g., aspects specific to an English Slot Grammar (ESG) parser). Furthermore, the data parsing application may include a predicate-argument structure (PAS) builder. The PAS builder may simplify and abstract results generated by the slot grammar parser. Additionally, the data parsing application may include higher level natural language processing capabilities such as inferencing and deep semantic processing. The data parsing application may parse the language in the participant activity stream update via one or more of the slot grammar parser, the PAS builder, and higher level natural language processing capabilities. The data parsing application may parse out insignificant language (e.g., articles, conjunctions, auxiliary verbs, pronouns, and prepositions). Upon parsing the language in the participant activity stream update, the data parsing application may return the determined one or more terms to the client application. According to an embodiment, the server social networking application may facilitate processing of the one or more terms determined at step 310.

At step 315, the client application may facilitate parsing of language associated with the client to determine one or more terms associated with the client. Specifically, the client application may derive language associated with the client from at least one of activity stream updates of the client and information associated with a profile of the client (e.g., client interests). The client application may consider all client activity stream updates that have been posted within a predefined time range, or alternatively the client application may consider a predefined number of recent client activity stream updates. The client application may send the derived client language to the data parsing application to determine the one or more terms. The data parsing application may parse the derived client language via one or more of the slot grammar parser, the PAS builder, and higher level natural language processing capabilities. The data parsing application may parse out insignificant language (e.g., articles, conjunctions, auxiliary verbs, pronouns, and prepositions). Upon parsing the derived client language, the data parsing application may return the determined one or more terms to the client application. According to an embodiment, the server social networking application may facilitate processing of the one or more terms determined at step 315.

At step 320, the client application may adjust the relevancy score by iteratively comparing the one or more terms associated with the participant activity stream update and the one or more terms associated with the client. Details regarding adjusting the relevancy score according to step 320 are further described with respect to FIG. 4.

Figure 4:
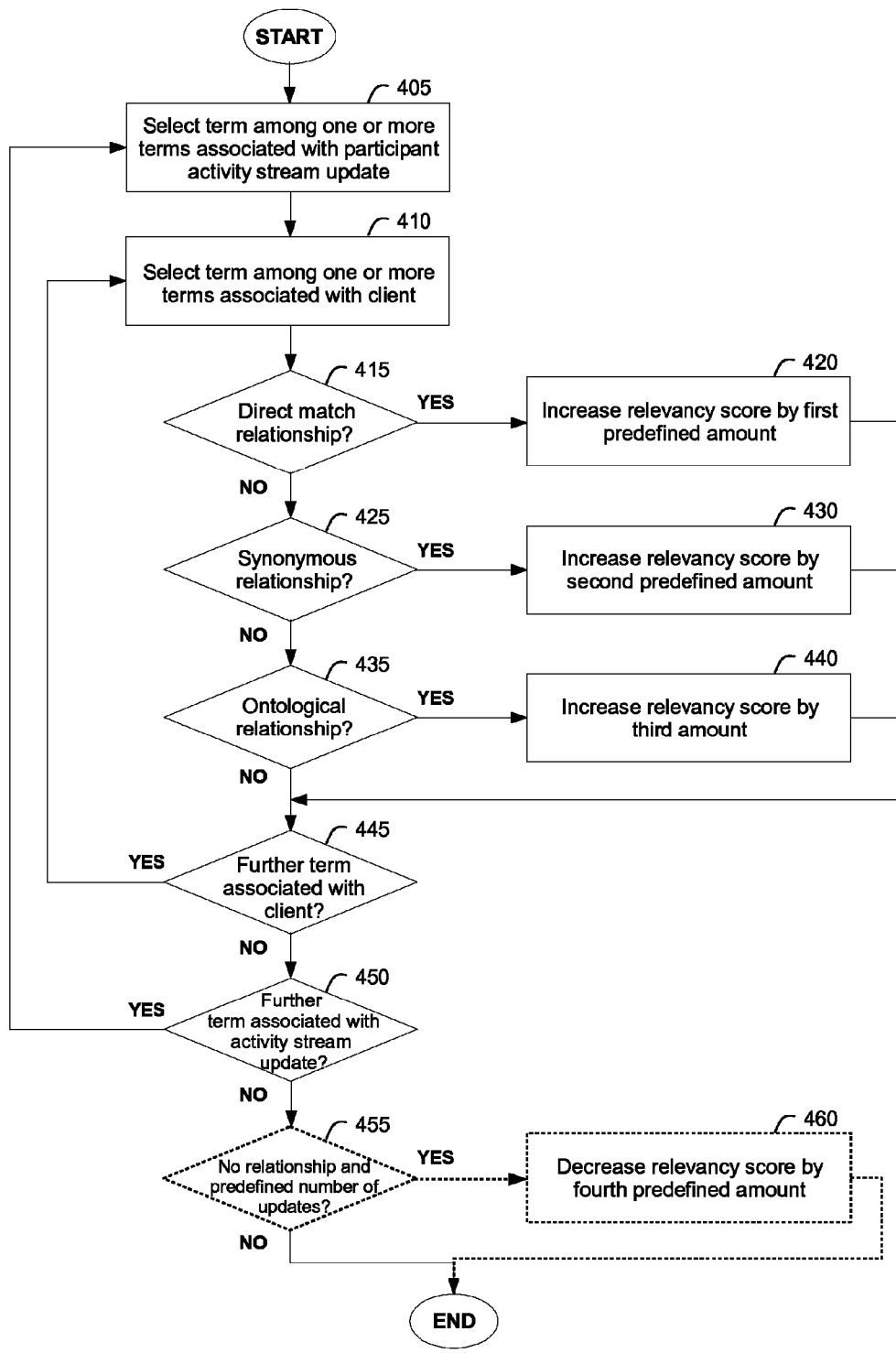
FIG. 4 illustrates a method of adjusting a relevancy score, according to an embodiment.

FIG. 4 illustrates a method 400 of adjusting the relevancy score based upon a comparison of each of the one or more terms associated with the participant activity stream update (e.g., determined according to step 310) and each of the one or more terms associated with the client (e.g., determined according to step 315). The method 400 provides further detail with respect to step 320 of the method 300. The method 400 may begin at step 405, where the client application may select a term among the one or more terms associated with the participant activity stream update. At step 410, the client application may select a term among the one or more terms associated with the client.

At step 415, the client application may determine whether a direct match relationship exists between the selected term associated with the participant activity stream update and the selected term associated with the client. A direct match relationship in the context of the disclosure exists when a term associated with the participant activity stream update and a term associated with the client are identical. In an embodiment, the client application may consult a language processing application (e.g., language processing application 153 of server system 135) to determine whether a direct match relationship exists. Upon determining that a direct match relationship exists, at step 420 the client application may increase the relevancy score by a first predefined amount, and the method 400 may proceed to step 445.

Upon determining that no direct match relationship exists, at step 425 the client application may determine whether a synonymous relationship exists between the selected term associated with the participant activity stream update and the selected term associated with the client. A synonymous relationship in the context of the disclosure exists when a term associated with the participant activity stream update and a term associated with the client are synonyms but are not identical. In an embodiment, the client application may consult the language processing application to determine whether a synonymous relationship exists. Upon determining that a synonymous relationship exists, at step 430 the client application may increase the relevancy score by a second predefined amount, and the method 400 may proceed to step 445. In an embodiment, the second predefined amount may be less than the first predefined amount.

Upon determining that no synonymous relationship exists, at step 435 the client application may determine whether an ontological relationship exists between the selected term associated with the participant activity stream update and the selected term associated with the client. An ontological relationship in the context of the disclosure exists when a term associated with the participant activity stream update and a term associated with the client have an ontological relationship (e.g., a relationship determined via ontological analysis) but are not identical or synonymous. In an embodiment, the client application may consult at least one of the language processing application and an ontology (e.g., ontology 161 of server system 135) to determine whether an ontological relationship exists. Upon determining that a ontological relationship exists, at step 440 the client application may increase the relevancy score by a third amount. In an embodiment, the third amount may be less than the second predefined amount. Furthermore, magnitude of the third amount may be determined by a number of degrees of separation between the term associated with the participant activity stream update and the term associated with the client as determined via ontological analysis—e.g., via analysis of an ontology tree. For instance, if there is a single degree of separation in an ontology tree between the term associated with the participant activity stream update and the term associated with the client, the magnitude of the third amount may be a higher designated value than if there were two or more degrees of separation between the terms.

At step 445, the client application may determine whether there is a further term to process among the one or more terms associated with the client. If there is a further term associated with the client to process, then the method 400 may return to step 410. If there is no further term associated with the client to process, then at step 450 the client application may determine whether there is a further term to process among the one or more terms associated with the participant activity stream update. If there is a further term associated with the participant activity stream update to process, then the method 400 may return to step 405.

Optionally, at step 455, the client application may determine whether no relationship exists between a term associated with the participant activity stream update and a term associated with the client and further may determine whether the participant has posted a predefined number of activity stream updates within a predefined duration of time. A determination of no relationship may be made by determining whether the relevancy score at step 455 remains equal to the baseline value. The predefined number of activity stream updates in this context may be defined by a number of updates above a designated percentage (e.g., 50%) of an average number of updates posted by the plurality of social networking participants. Upon determining that no relationship exists, and upon further determining that the participant has posted the predefined number of activity stream updates within the predefined period of time, then at step 460 the client application may decrease the relevancy score by a fourth predefined amount. Accordingly, relevancy score may be decreased for a participant who posts an activity stream update for which the client may have little interest, if such participant posts activity stream updates on a frequent basis. In an embodiment, the client application may provide the client an option to adjust one or more of the predefined values for the method 400.

Figure 5:
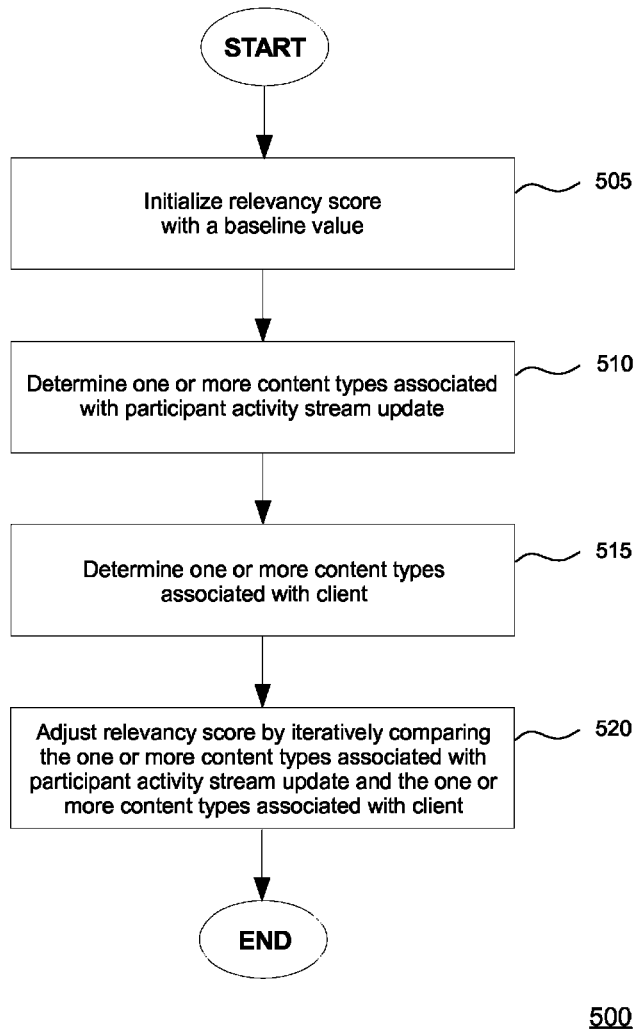
FIG. 5 illustrates a method of calculating a relevancy score based upon content in the activity stream update, according to a further embodiment.

FIG. 5 illustrates a method 500 of calculating the relevancy score based upon content in the activity stream update of the participant. The method 500 provides a further embodiment with respect to step 210 of the method 200. The method 500 may begin at step 505, where the client application may initialize the relevancy score with a baseline value. The baseline value may be a default value (e.g., 0) that may be modified based upon content in the participant activity stream update. At step 510, the client application may determine one or more content types associated with the participant activity stream update. The one or more content types may include at least one of application instances, Internet hyperlinks, and audiovisual resources. At step 515, the client application may determine one or more content types associated with the client. The client application may determine the one or more content types at step 515 from at least one of client activity stream updates and information associated with the client profile. The client application may consider client activity stream updates that have been posted within a predefined time range, or alternatively the client application may consider a predefined number of recent client activity stream updates.

At step 520, the client application may adjust the relevancy score by iteratively comparing the one or more content types associated with the participant activity stream update and the one or more content types associated with the client. Specifically, in one embodiment, the client application may iterate through each of the one or more content types associated with the participant activity stream update to determine whether there is a matching content type among the one or more content types associated with the client, and the client application may increase the relevancy score by a predefined amount for each such match. For example, the client application may increase the relevancy score by the predefined amount upon determining that a participant activity stream update pertains to a gaming application that also is associated with the client. In an embodiment, the client application may provide the client an option to adjust the predefined amount for the method 500.

Figure 6:
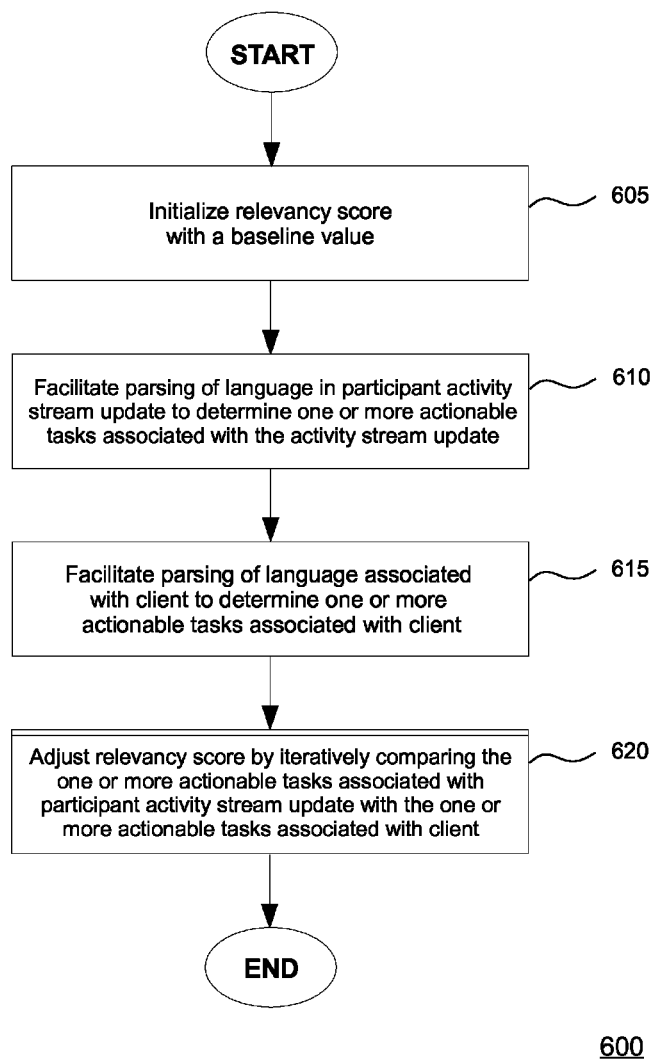
FIG. 6 illustrates a method of calculating a relevancy score based upon content in the activity stream update, according to a further embodiment.

FIG. 6 illustrates a method 600 of calculating the relevancy score based upon content in the activity stream update of the participant. The method 600 provides a further embodiment with respect to step 210 of the method 200. The method 600 may begin at step 605, where the client application may initialize the relevancy score with a baseline value. The baseline value may be a default value (e.g., 0) that may be modified based upon content in the participant activity stream update.

At step 610, the client application may facilitate parsing of language in the participant activity stream update to determine one or more actionable tasks associated with the activity stream update. Specifically, the client application may send language in the participant activity stream update to the aforementioned data parsing application in order to determine any actionable tasks. In the context of this disclosure, an actionable task may be defined as an action verb and one or more associated objects. Such one or more objects may include at least one of a direct object upon which the action verb acts or an object of a prepositional phrase following the action verb. A non-action verb and any corresponding object(s) are not considered part of an actionable task. The data parsing application may parse the language in the participant activity stream update via one or more of the slot grammar parser, the PAS builder, and higher level natural language processing capabilities. The data parsing application may discard articles, conjunctions, pronouns, prepositions, and auxiliary verbs associated with action verbs. Upon parsing the language in the participant activity stream update, the data parsing application may return the determined one or more actionable tasks to the client application. According to an embodiment, the server social networking application may facilitate processing of the determined one or more actionable tasks.

At step 615, the client application may facilitate parsing of language associated with the client to determine one or more actionable tasks associated with the client. Specifically, the client application may derive language associated with the client from at least one of client activity stream updates and information associated with the client profile (e.g., client interests). The client application may consider all client activity stream updates that have been posted within a predefined time range, or alternatively the client application may consider a predefined number of recent client activity stream updates. The client application may send the derived client language to the aforementioned data parsing application to determine the one or more actionable tasks. The data parsing application may parse the derived client language via one or more of the slot grammar parser, the PAS builder, and higher level natural language processing capabilities. The data parsing application may discard articles, conjunctions, pronouns, prepositions, and auxiliary verbs associated with action verbs. Upon parsing the derived client language, the data parsing application may return the determined one or more actionable tasks to the client application. According to an embodiment, the server social networking application may facilitate processing of the determined one or more actionable tasks.

At step 620, the client application may adjust the relevancy score by iteratively comparing the one or more actionable tasks associated with the participant activity stream update and the one or more actionable tasks associated with the client. Details regarding adjusting the relevancy score according to step 620 are further described with respect to FIG. 7.

Figure 7A:
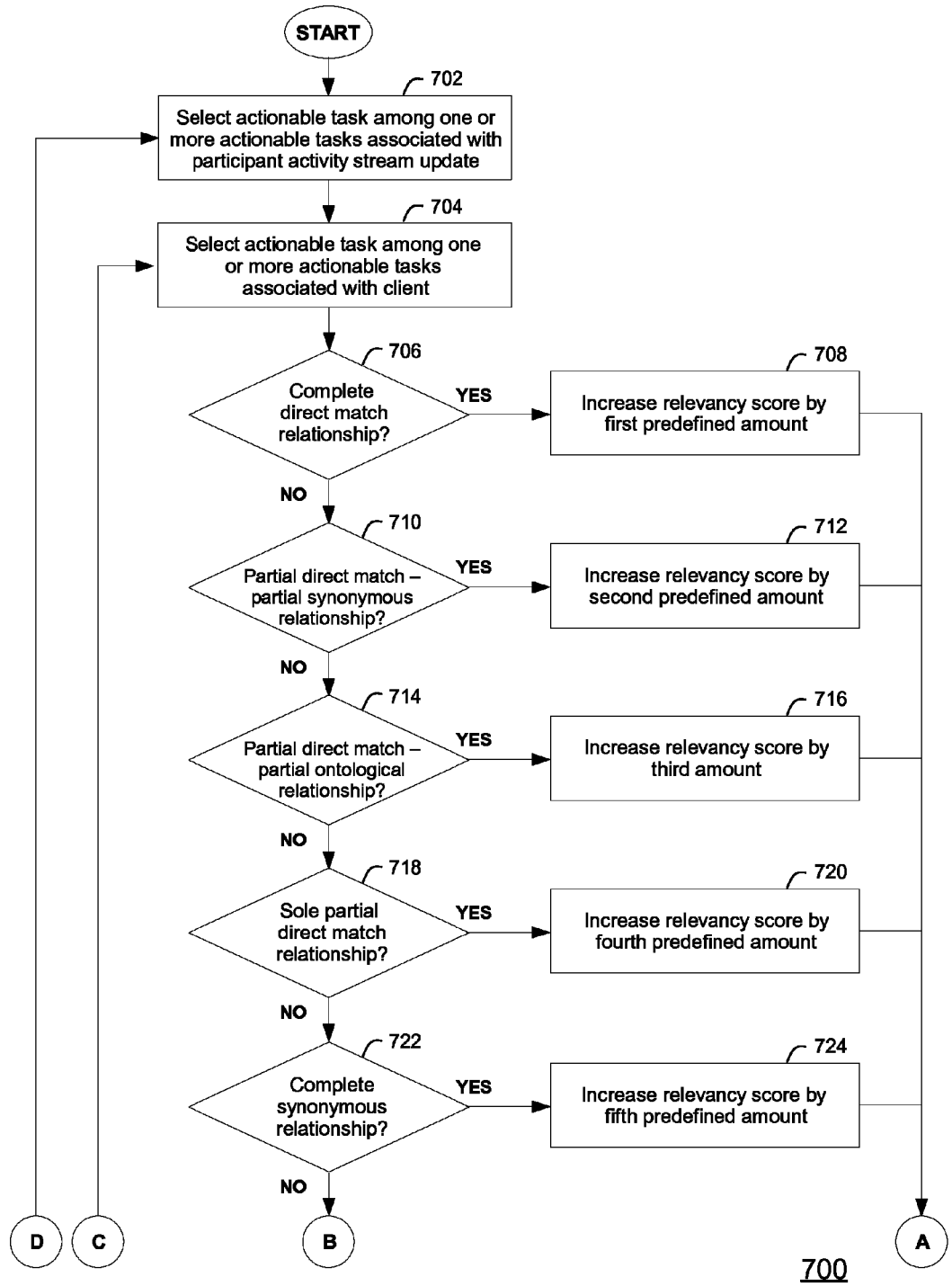
FIGS. 7*a* and 7*b* illustrate a method of adjusting a relevancy score, according to a further embodiment.
Figure 7B:
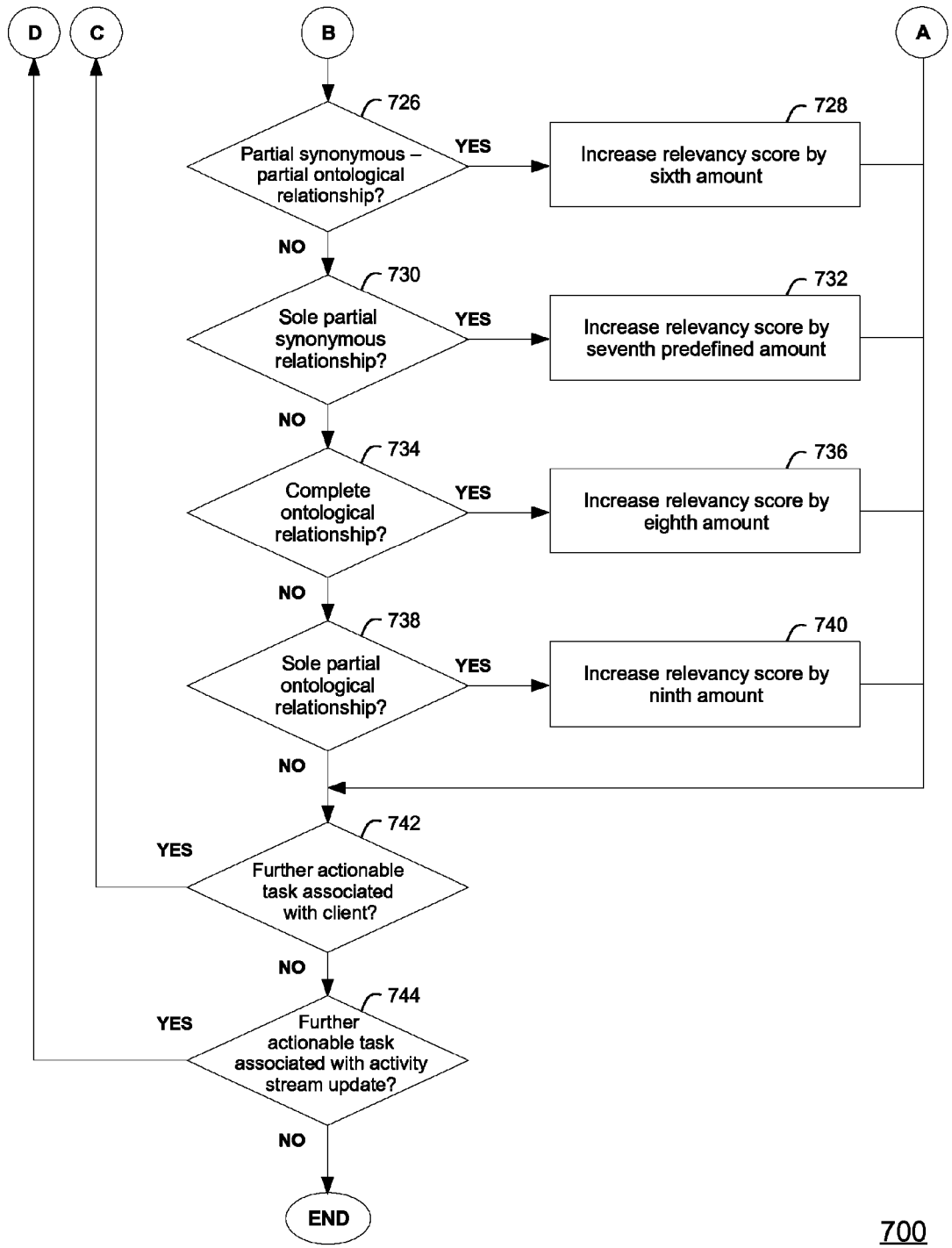

FIG. 7 illustrates a method 700 of adjusting the relevancy score based upon a comparison of each of the one or more actionable tasks associated with the participant activity stream update and each of the one or more actionable tasks associated with the client, according to one embodiment. The method 700 provides further detail with respect to step 620 of the method 600. The method 700 may begin at step 702, where the client application may select an actionable task among the one or more actionable tasks associated with the participant activity stream update. At step 704, the client application may select an actionable task among the one or more actionable tasks associated with the client.

At step 706, the client application may determine whether a complete direct match relationship exists between the selected actionable task associated with the participant activity stream update and the selected actionable task associated with the client. A complete direct match relationship in the context of the disclosure exists when both an action verb and an object of an actionable task associated with the participant activity stream update are respectively identical to an action verb and an object of an actionable task associated with the client. In an embodiment, the client application may consult the aforementioned language processing application to determine whether a complete direct match relationship exists. Upon determining that a complete direct match relationship exists, at step 708 the client application may increase the relevancy score by a first predefined amount, and the method 700 may proceed to step 742.

Upon determining that no complete direct match relationship exists, at step 710 the client application may determine whether a partial direct match—partial synonymous relationship exists between the between the selected actionable task associated with the participant activity stream update and the selected actionable task associated with the client. A partial direct match—partial synonymous relationship in the context of the disclosure exists when either (but not both) of an action verb or an object of an actionable task associated with the participant activity stream update is identical to an action verb or an object of an actionable task associated with the client, and either (but not both) of an action verb or an object of an actionable task associated with the participant activity stream update is synonymous with, but is not identical to, an action verb or an object of an actionable task associated with the client. In an embodiment, the client application may consult the language processing application to determine whether a partial direct match—partial synonymous relationship exists. Upon determining that a partial direct match—partial synonymous relationship exists, at step 712 the client application may increase the relevancy score by a second predefined amount, and the method 700 may proceed to step 742. In an embodiment, the second predefined amount may be less than the first predefined amount.

Upon determining that no partial direct match—partial synonymous relationship exists, at step 714 the client application may determine whether a partial direct match—partial ontological relationship exists between the selected actionable task associated with the participant activity stream update and the selected actionable task associated with the client. A partial direct match—partial ontological relationship in the context of the disclosure exists when either (but not both) of an action verb or an object of an actionable task associated with the participant activity stream update is identical to an action verb or an object of an actionable task associated with the client, and either (but not both) of an action verb or an object of an actionable task associated with the participant activity stream update has an ontological relationship with, but is not synonymous with or identical to, an action verb or an object of an actionable task associated with the client. In an embodiment, the client application may consult at least one of the language processing application and the aforementioned ontology to determine whether a partial direct match—partial ontological relationship exists. Upon determining that a partial direct match—partial ontological relationship exists, at step 716 the client application may increase the relevancy score by a third amount, and the method 700 may proceed to step 742. In an embodiment, the third amount may be less than the second predefined amount. Furthermore, magnitude of the third amount may be partially predefined (as a result of the partial direct match) and partially determined by a number of degrees of separation between the ontologically related portion of the actionable task associated with the participant activity stream update and the ontologically related portion of the actionable task associated with the client, as determined via ontological analysis. For instance, if there is a single degree of separation in an ontology tree between the ontologically related portion of the actionable task associated with the participant activity stream update and the ontologically related portion of the actionable task associated with the client, the magnitude of the third amount may be a higher designated value than if there were two or more degrees of separation between the ontologically related portions.

Upon determining that no partial direct match—partial ontological relationship exists, at step 718 the client application may determine whether a sole partial direct match relationship exists between the selected actionable task associated with the participant activity stream update and the selected actionable task associated with the client. A sole partial direct match relationship in the context of the disclosure exists when either (but not both) of an action verb or an object of an actionable task associated with the participant activity stream update is identical to an action verb or an object of an actionable task associated with the client, without any further relationship between the actionable tasks. In an embodiment, the client application may consult the language processing application to determine whether a sole partial direct match relationship exists. Upon determining that a sole partial direct match relationship exists, at step 720 the client application may increase the relevancy score by a fourth predefined amount, and the method 700 may proceed to step 742. In an embodiment, the fourth predefined amount may be less than the third amount. For instance, the fourth predefined amount may be equivalent to the predefined portion of the third amount.

Upon determining that no sole partial direct match relationship exists, at step 722 the client application may determine whether a complete synonymous relationship exists between the selected actionable task associated with the participant activity stream update and the selected actionable task associated with the client. A complete synonymous relationship in the context of the disclosure exists when both an action verb and an object of an actionable task associated with the participant activity stream update are respectively synonymous with, but are not identical to, an action verb and an object of an actionable task associated with the client. In an embodiment, the client application may consult the language processing application to determine whether a complete synonymous relationship exists. Upon determining that a complete synonymous relationship exists, at step 724 the client application may increase the relevancy score by a fifth predefined amount, and the method 700 may proceed to step 742. In an embodiment, the fifth predefined amount may be less than the fourth predefined amount.

Upon determining that no complete synonymous relationship exists, at step 726 the client application may determine whether a partial synonymous—partial ontological relationship exists between the selected actionable task associated with the participant activity stream update and the selected actionable task associated with the client. A partial synonymous—partial ontological relationship in the context of the disclosure exists when either (but not both) of an action verb or an object of an actionable task associated with the participant activity stream update is synonymous with, but is not identical to, an action verb or an object of an actionable task associated with the client, and either (but not both) of an action verb or an object of an actionable task associated with the participant activity stream update has an ontological relationship with, but is not synonymous with or identical to, an action verb or an object of an actionable task associated with the client. In an embodiment, the client application may consult at least one of the language processing application and the ontology to determine whether a partial synonymous—partial ontological relationship exists. Upon determining that a partial synonymous—partial ontological relationship exists, at step 728 the client application may increase the relevancy score by a sixth amount, and the method 700 may proceed to step 742. In an embodiment, the sixth amount may be less than the fifth predefined amount. Furthermore, magnitude of the sixth amount may be partially predefined (as a result of the partial synonymous relationship) and may be partially determined by a number of degrees of separation between the ontologically related portion of the actionable task associated with the participant activity stream update and the ontologically related portion of the actionable task associated with the client, as determined via ontological analysis.

Upon determining that no partial synonymous—partial ontological relationship exists, at step 730 the client application may determine whether a sole partial synonymous relationship exists between the selected actionable task associated with the participant activity stream update and the selected actionable task associated with the client. A sole partial synonymous relationship in the context of the disclosure exists when either (but not both) of an action verb or an object of an actionable task associated with the participant activity stream update is synonymous with, but is not identical to, an action verb or an object of an actionable task associated with the client, without any further relationship between the actionable tasks. In an embodiment, the client application may consult the language processing application to determine whether a sole partial synonymous relationship exists. Upon determining that a sole partial synonymous relationship exists, at step 732 the client application may increase the relevancy score by a seventh predefined amount, and the method 700 may proceed to step 742. In an embodiment, the seventh predefined amount may be less than the sixth amount. For instance, the seventh predefined amount may be equivalent to the predefined portion of the sixth amount.

Upon determining that no sole partial synonymous relationship exists, at step 734 the client application may determine whether a complete ontological relationship exists between the selected actionable task associated with the participant activity stream update and the selected actionable task associated with the client. A complete ontological relationship in the context of the disclosure exists when both an action verb and an object of an actionable task associated with the participant activity stream update are respectively ontologically related to, but are not identical to or synonymous with, an action verb and an object of an actionable task associated with the client. In an embodiment, the client application may consult at least one of the language processing application and the ontology to determine whether a complete ontological relationship exists. Upon determining that a complete ontological relationship exists, at step 736 the client application may increase the relevancy score by an eighth amount, and the method 700 may proceed to step 742. In an embodiment, the eighth amount may be less than the seventh predefined amount. Furthermore, magnitude of the eighth amount may be determined by respective numbers of degrees of separation between each respective ontologically related portion of the actionable task associated with the participant activity stream update and each respective ontologically related portion of the actionable task associated with the client, as determined via ontological analysis.

Upon determining that no complete ontological relationship exists, at step 738 the client application may determine whether a sole partial ontological relationship exists between the selected actionable task associated with the participant activity stream update and the selected actionable task associated with the client. A sole partial ontological relationship in the context of the disclosure exists when either (but not both) of an action verb or an object of an actionable task associated with the participant activity stream update is ontologically related to, but is not identical to or synonymous with, an action verb or an object of an actionable task associated with the client, without any further relationship between the actionable tasks. In an embodiment, the client application may consult at least one of the language processing application and the ontology to determine whether a sole partial ontological relationship exists. Upon determining that a sole partial ontological relationship exists, at step 740 the client application may increase the relevancy score by a ninth amount. In an embodiment, the ninth amount may be less than the eighth amount. Furthermore, magnitude of the ninth amount may be determined by a number of degrees of separation between the ontologically related portion of the actionable task associated with the participant activity stream update and the ontologically related portion of the actionable task associated with the client, as determined via ontological analysis.

At step 742, the client application may determine whether there is a further actionable task to process among the one or more actionable tasks associated with the client. If there is a further actionable task associated with the client to process, then the method 700 may return to step 704. If there is no further actionable task associated with the client to process, at step 744 the client application may determine whether there is a further actionable task to process among the one or more actionable tasks associated with the participant activity stream update. If there is a further actionable task associated with the participant activity stream update to process, then the method 700 may return to step 702. In an embodiment, the client application may provide the client an option to adjust one or more of the predefined values for the method 700.

Figure 8:
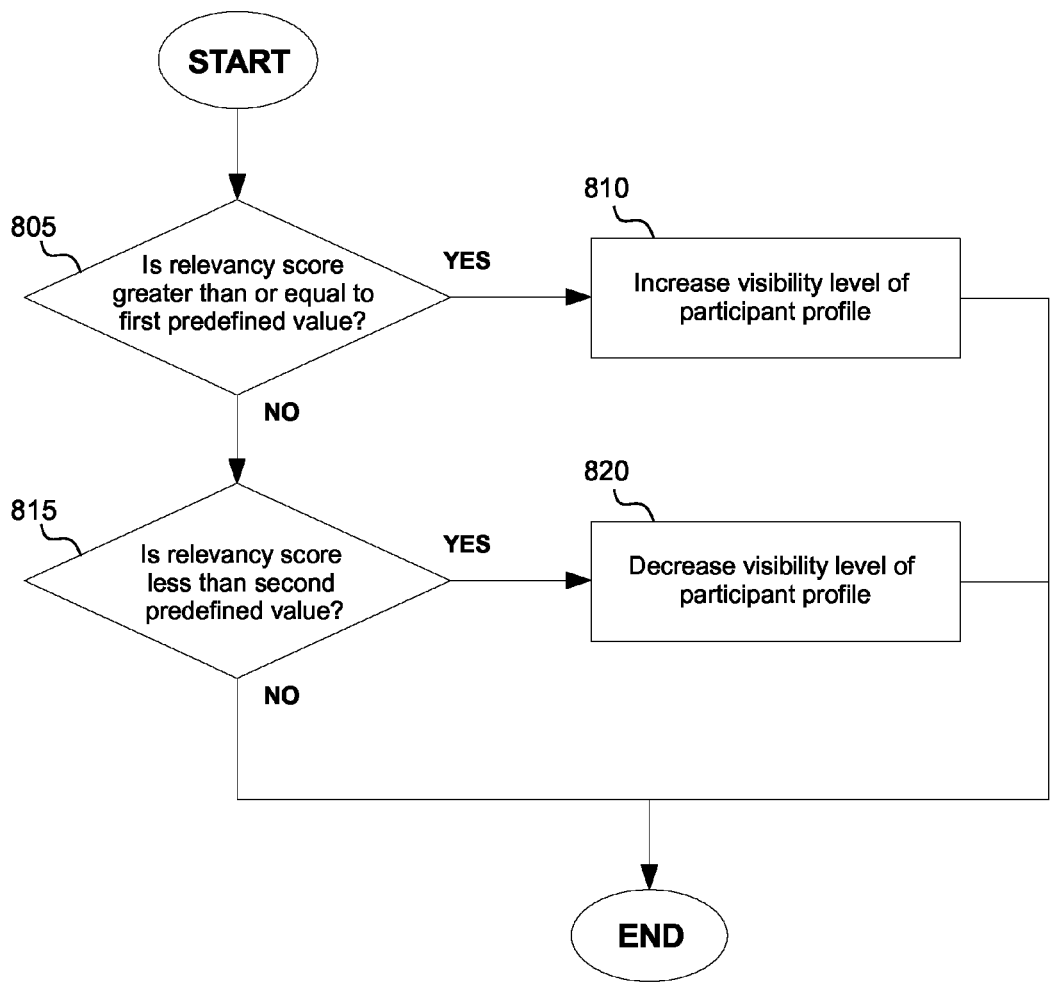
FIG. 8 illustrates a method of adjusting visibility level of a participant profile in a social networking interface, according to an embodiment.

FIG. 8 illustrates a method 800 of adjusting the visibility level of the participant profile in the social networking interface. The method 800 provides further detail with respect to step 215 of the method 200. The method 800 may begin at step 805, where the client application may determine whether the relevancy score for the participant (e.g., calculated at step 210 of the method 200) is greater than or equal to a first predefined threshold value. Upon determining that the relevancy score is greater than or equal to the first predefined threshold value, at step 810 the client application may increase the visibility level of the participant profile, and the process may end. Upon determining that the relevancy score is less than the first predefined threshold value, at step 815 the client application may determine whether the relevancy score for the participant is less than a second predefined threshold value. Upon determining that the relevancy score is less than the second predefined threshold value, at step 820 the client application may decrease the visibility level of the participant profile. Upon determining that the relevancy score is greater than or equal to the second predefined threshold value, the process may end.

According to one embodiment, the first predefined threshold may be greater than the second predefined threshold. According to such embodiment, the client application will leave the visibility level of the participant profile unchanged upon determining that the relevancy score is less than the first predefined threshold value but greater than or equal to the second predefined threshold value. According to an alternative embodiment, the first predefined threshold may be equivalent to the second predefined threshold.

In an embodiment, the client application may define a number of visibility levels by which the participant profile is increased upon determining that the relevancy score is greater than or equal to the first predefined threshold value at step 805. The client application also may define a number of visibility levels by which the participant profile decreased upon determining that the relevancy score is less than the second predefined threshold value at step 815. For instance, the client application may define that the participant profile is to be increased one visibility level upon determining that the relevancy score is greater than or equal to the first predefined threshold value at step 805 and further may define that the participant profile is to be decreased one visibility level upon determining that the relevancy score is less than the second predefined threshold value at step 815. The client application may provide the client an option to adjust one or more of the predefined threshold values and the number of visibility levels for the method 800.

In a further embodiment, additional predefined threshold values may be defined in the context of the method 800. For instance, the client application may define that the participant profile is to be increased two visibility levels upon determining that the relevancy score is greater than or equal to a third predefined threshold value, wherein the third predefined threshold value is greater than the first predefined threshold value. Additionally, the client application may define that the participant profile is to be decreased two visibility levels upon determining that the relevancy score is less than a fourth predefined threshold value, wherein the fourth predefined threshold value is less than the second predefined threshold value. In such embodiment, the client application may provide the client an option to adjust one or more of these additional predefined threshold values.

Adjusting the visibility level of the participant profile in the method 800 according to one embodiment may include adjusting visibility level of a thumbnail image of the participant. Specifically, a thumbnail image representing the participant in the client social networking interface may be one of a plurality of predefined sizes. Such thumbnail image may be located in a participant identification section of the social networking interface. According to such embodiment, increasing the visibility level of the thumbnail image at step 810 may include increasing the thumbnail image size to a predefined size larger than a current predefined size. Conversely, decreasing the visibility level of the thumbnail image at step 820 may include decreasing the thumbnail image size to a predefined size smaller than the current predefined size.

According to a further embodiment, adjusting the visibility level of the participant profile in the method 800 may include adjusting visibility level of attributes of a border around the thumbnail image of the participant. Border attributes such as color intensity or size may be modified to increase or decrease visibility of the participant profile. Specifically, a border may have predefined degrees of color intensity. Increasing visibility of the border at step 810 may include increasing color intensity of the border to a higher predefined degree than a current predefined degree. Conversely, decreasing visibility of the border at step 820 may include decreasing color intensity to a lower predefined degree than the current predefined degree. Furthermore, a border may be one of a plurality of predefined sizes, and increasing visibility of the border at step 810 may include increasing border size to a larger predefined size than a current predefined size. Conversely, decreasing visibility of the border at step 820 may include decreasing border size to a smaller predefined size than the current predefined size.

According to a further embodiment, in a scenario in which relevancy score is calculated by determining one or more actionable tasks associated with the participant activity stream update and one or more actionable tasks associated with the client (e.g., according to the methods 600 and 700), the client application may include a caption in the social networking interface adjacent to the thumbnail image of the participant upon determining that the calculated relevancy score exceeds a predefined actionable task threshold value. Specifically, the caption may include the natural language of the participant activity stream update.

According to an embodiment, the steps of the methods 200-800 may be carried out by the server social networking application on the server system or a social networking application of another computing system rather than the client social networking application on the client computing system. For instance, if the client computing system is a thin client, all processing may occur at the server system, and relevant data required for display of the client social networking interface may be sent to the client computing system via the network.

Figure 9:
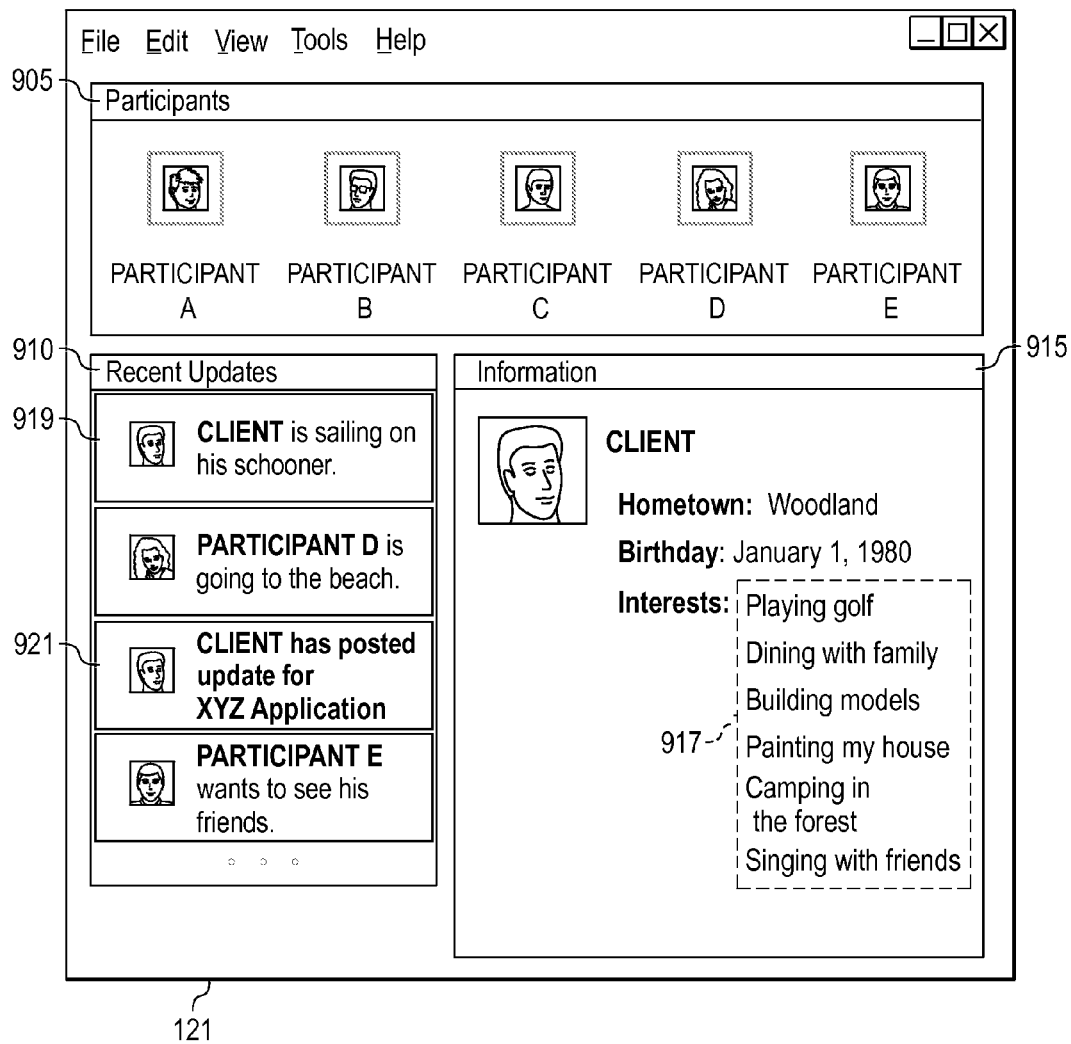
FIG. 9 illustrates a client social networking interface, according to an embodiment.

FIG. 9 illustrates social networking interface 121 as presented by a client social networking application 119 running in memory 107 of client computing system 105, according to an embodiment. Social networking interface 121 may include a participant identification section 905, an activity stream 910, and client profile information 915. Participant identification section 905 may include all or a subset of participants associated with the client within client application 119. As shown, participant identification section 905 includes respective profiles for Participant A, Participant B, Participant C, Participant D, and Participant E. Each participant profile includes an identifier in the form of a thumbnail image with a border. Activity stream 910 may display recent activity stream updates associated with the client and the participants included in participant identification section 905. Activity stream 910 may include activity stream updates in temporal order, with the newest activity stream update at the top. Client profile information 915 includes personal information provided by the client, including hometown, birthday, and interests 917. As shown in FIG. 9, the client has posted two recent activity stream updates in activity stream 910. Activity stream update 919 is a natural language update. Activity stream update 921 pertains to an update for an application, specifically Application XYZ.

Figure 10:
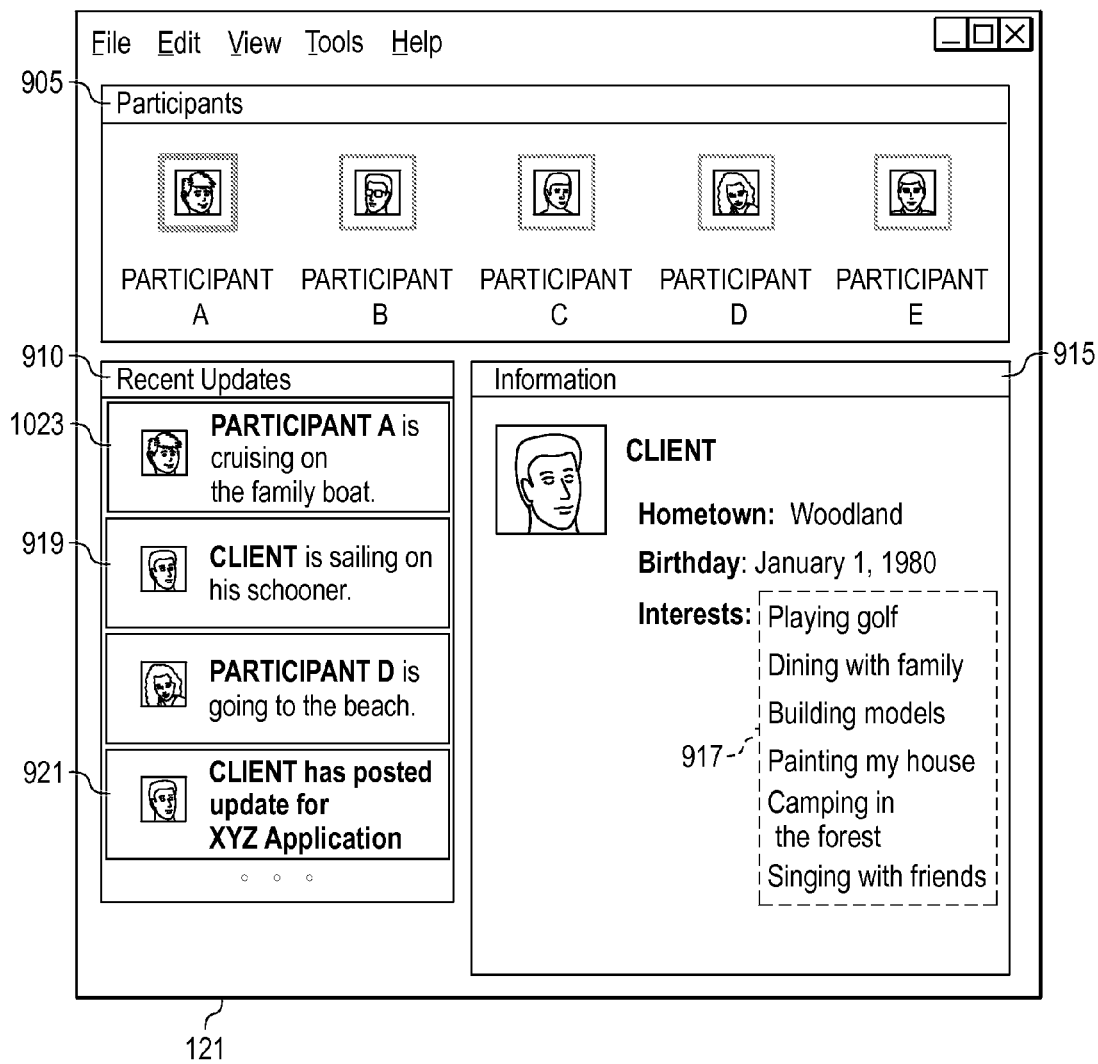
FIG. 10 illustrates an example scenario of adjusting visibility level of a participant profile in the client social networking interface illustrated in FIG. 9, according to an embodiment.

FIG. 10 illustrates social networking interface 121 upon posting of a new activity stream update 1023 by Participant A. FIG. 10 illustrates an example scenario in which prominence of the profile of Participant A is adjusted from the visibility level illustrated in FIG. 9 according to the method 200. More specifically, in this example scenario, relevancy score is calculated and adjusted for Participant A based on the content of activity stream update 1023 according to the methods 300 and 400, and visibility level of the profile of Participant A is adjusted based on the calculated relevancy score according to the method 800.

For the example scenario of FIG. 10, it is assumed that the relevancy score is initialized to a baseline value of 0 according to step 305 of the method 300. According to step 310, client application 119 may facilitate parsing of language in activity stream update 1023 of Participant A to determine terms associated therewith. Specifically, client application 119 may send language in activity stream update 1023 to data parsing application 151, which may determine the following terms associated with activity stream update 1023: "cruising", "family", and "boat". Data parsing application 151 may ignore insignificant articles, conjunctions, auxiliary verbs, pronouns, and prepositions.

Furthermore, according to step 315, client application 119 may facilitate parsing of language associated with the client to determine terms associated therewith. For purposes of this example, client application 119 may derive client language from interests 917 listed in client profile information 915 as well as the past two client activity stream updates 919 and 921. Client application 119 may send client language derived from interests 917 and client activity stream updates 919 and 921 to data parsing application 151, which may determine the following terms associated with the client: "sailing", "schooner", "playing", "golf", "dining", "family", "building", "models", "painting", "house", "camping", "forest", "singing", and "friends".

According to the example scenario of FIG. 10, adjustment of the relevancy score according to step 320 is assumed to occur via the method 400. According to the method 400, each of the terms associated with activity stream update 1023 of Participant A may be iteratively compared with each of the terms associated with the client. As a result of iteratively comparing the terms associated with activity stream update 1023 and the terms associated with the client, at step 415 client application 119 may determine that a direct match relationship exists based on the term "family", which is a term associated with both the client and activity stream update 1023 of Participant A. Accordingly, at step 420 client application 119 may increase the relevancy score, which initially is equal to the baseline value of 0, by a first predefined amount. For purposes of this example, the first predefined amount for a direct match relationship according to the method 400 is assumed to be 10. Thus, the relevancy score is increased by 10, such that the relevancy score is adjusted to 10.

Moreover, client application 119 may determine at step 425 that a synonymous relationship exists between the term "cruising" associated with activity stream update 1023 of Participant A and the term "sailing" associated with the client. Accordingly, at step 430 client application 119 may increase the relevancy score by a second predefined amount. For purposes of this example, the second predefined amount for a synonymous relationship according to the method 400 is assumed to be 7. Thus, the relevancy score is increased by 7, such that the relevancy score is adjusted to 17.

Furthermore, at step 435, client application 119 may determine that an ontological relationship exists between the term "boat" associated with Participant A and the term "schooner" associated with the client. Such ontological relationship may be determined by consulting an ontology tree, such as ontology tree 1100 as illustrated in FIG. 11.

Ontology tree 1100 includes nodes and branches connecting the nodes. Each node represents a category. Ontology tree 1100 is organized according to level of specificity, wherein a more general category is located at a higher tree level than a more specific category. A root node 1105 of ontology tree 1100 represents a category "vehicle", and each node connected to a root node 1105 one level below represents a sub-category of the category "vehicle". Specifically, each of a node 1110, representing category "boat", and a node 1115, representing category "car", represents a sub-category of root node 1105. Moreover, each node connected to node 1110 one level below represents a sub-category of the category "boat". Specifically, each of a node 1120, representing category "canoe", and a node 1125, representing category "schooner", represents a sub-category of the category "boat". Degrees of separation among the nodes of the ontology tree 1100 may be determined by counting the number of branches traversed from one node to another. For instance, since one branch is traversed from node 1110 representing category "boat" to node 1125 representing category "schooner", there is one degree of separation between category "boat" and category "schooner".

Figure 11:
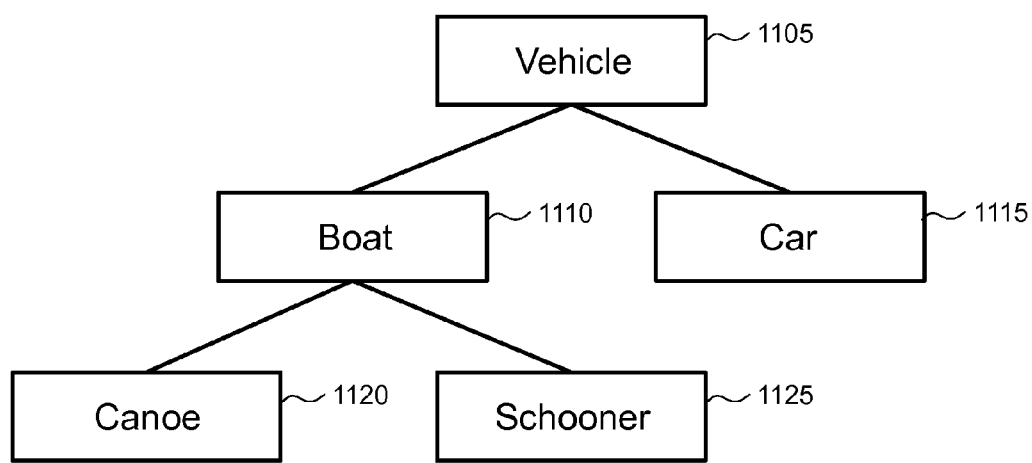
FIG. 11 illustrates an ontology tree, according to an embodiment.

At step 435, client application 119 may consult ontology tree 1100 of FIG. 11, which may be within ontology 161, and accordingly may determine an ontological relationship between the term "boat" associated with activity stream update 1023 of Participant A (based on category "boat" of node 1110) and the term "schooner" associated with the client (based on category "schooner" of node 1125). Moreover, client application 119 may determine one degree of separation between the terms, as there is one branch in ontology tree 1100 between node 1110 representing category "boat" and node 1125 representing category "schooner". Accordingly, at step 440 client application 119 may increase the relevancy score by a third amount. For purposes of this example, magnitude of the third amount for an ontological relationship is assumed to be 5 for one degree of separation, 4 for two degrees of separation, and 3 for three degrees of separation. Thus, the relevancy score is increased by 5 based on the determined ontological relationship with one degree of separation, such that the relevancy score is adjusted to 22.

Having calculated the relevancy score of 22 for Participant A according to the methods 300 and 400, client application 119 may adjust visibility level of the profile of Participant A within social networking interface 121 according to the method 800. For purposes of this example scenario, the first predefined threshold value according to the method 800 is assumed to be 20, and the second predefined threshold value is assumed to be 10. Moreover, for this example it is assumed that a participant profile is to be increased one visibility level or decreased one visibility level according to the method 800. Additionally, for this example it is assumed that adjusting visibility level of a participant profile entails increasing or decreasing size of the border around the thumbnail image representing the participant in participant identification section 905.

For this example scenario, at step 805 client application 119 may determine that the calculated relevancy score of 22 for Participant A is greater than the first predefined value of 20. Thus, at step 810 client application 119 may increase the visibility level of the profile of Participant A one visibility level. Specifically, client application 119 may increase the border size around the thumbnail image of Participant A in participant identification section 905 to one predefined size larger than the current predefined size. Illustratively, the border size around the thumbnail image for Participant A in participant identification section 905 of FIG. 10 is increased to a size assumed to be one predefined size larger than the border size around the thumbnail image for Participant A in participant identification section 905 of FIG. 9. Thus, as illustrated in FIG. 10, the prominence of the profile of Participant A has been increased based on activity stream update 1023.

Figure 12:
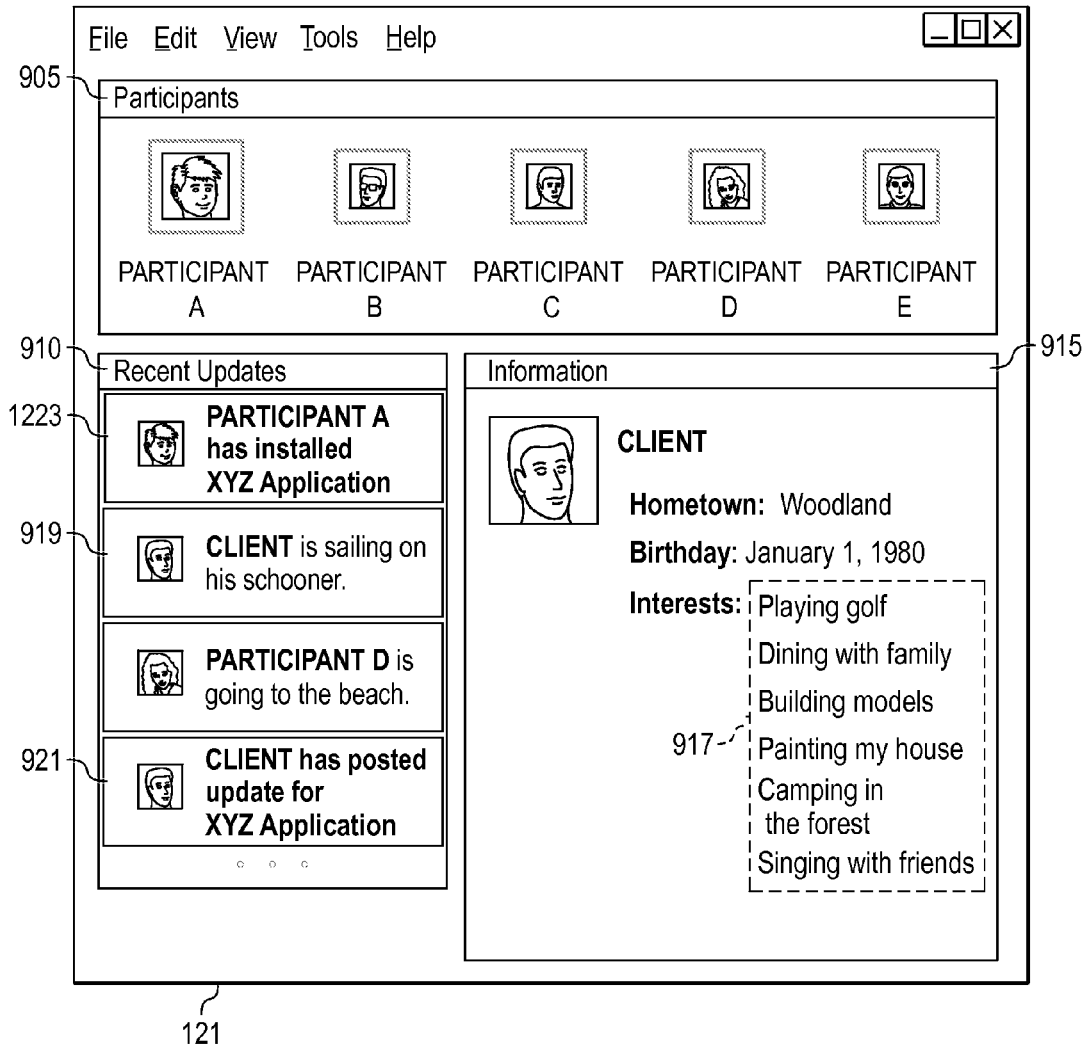
FIG. 12 illustrates a further example scenario of adjusting visibility level of a participant profile in the client social networking interface illustrated in FIG. 9, according to an embodiment.

FIG. 12 illustrates social networking interface 121 upon posting of a new activity stream update 1223 by Participant A. FIG. 12 illustrates a further example scenario in which prominence of the profile of Participant A is adjusted from the visibility level illustrated in FIG. 9 according to the method 200. More specifically, in this example scenario, relevancy score is calculated for Participant A based on the content of the activity stream update 1223 according to the method 500, and visibility level of the profile of Participant A is adjusted based on the calculated relevancy score according to the method 800.

For the example scenario of FIG. 12, it is assumed that the relevancy score is initialized to a baseline value of 0 according to step 505 of the method 500. According to step 510, client application 119 may determine one or more content types associated with activity stream update 1223 of Participant A. In this example, client application 119 may determine that activity stream update 1223 references installation of "XYZ Application". Furthermore, according to step 515, client application 119 may determine one or more content types associated with the client. For purposes of this example, client application 119 may determine the one or more content types from material listed in client profile information 915 as well as the past two client activity stream updates 919 and 921. In this example, client application 119 may determine that client activity stream update 921 references an update for "XYZ Application".

At step 520, client application may adjust the relevancy score based on iterative comparison of the one or more content types associated with activity stream update 1223 of Participant A and the one or more content types associated with the client. During such comparison, client application 119 may determine that "XYZ Application" is associated with both activity stream update 1223 of Participant A and the client. Accordingly, at client application 119 may increase the relevancy score, which initially is equal to the baseline value of 0, by a predefined amount. For purposes of this example, it is assumed that the predefined amount for a content type match according to the method 500 is 20. Thus, the relevancy score is increased by 20, such that the relevancy score is adjusted to 20.

Having calculated the relevancy score of 20 for Participant A according to the method 500, client application 119 may adjust visibility level of the profile of Participant A within social networking interface 121 according to the method 800. For purposes of this example scenario, the first predefined threshold value according to the method 800 is assumed to be 20, and the second predefined threshold value is assumed to be 10. Moreover, for this example it is assumed that a participant profile is to be increased one visibility level or decreased one visibility level according to the method 800. Additionally, for this example it is assumed that adjusting visibility level of a participant profile entails increasing or decreasing size of the thumbnail image representing the participant in participant identification section 905.

For this example scenario, at step 805 client application 119 may determine that the calculated relevancy score of 20 for Participant A is equal to the first predefined value of 20. Thus, at step 810 client application 119 may increase the visibility level of the profile of Participant A one visibility level. Specifically, client application 119 may increase the thumbnail image size of Participant A in participant identification section 905 to one predefined size larger than the current predefined size. Illustratively, the thumbnail image for Participant A in participant identification section 905 of FIG. 12 is increased to a size assumed to be one predefined size larger than the thumbnail image size for Participant A in participant identification section 905 of FIG. 9. Thus, as illustrated in FIG. 12, the prominence of the profile of Participant A has been increased based on activity stream update 1223.

Figure 13:
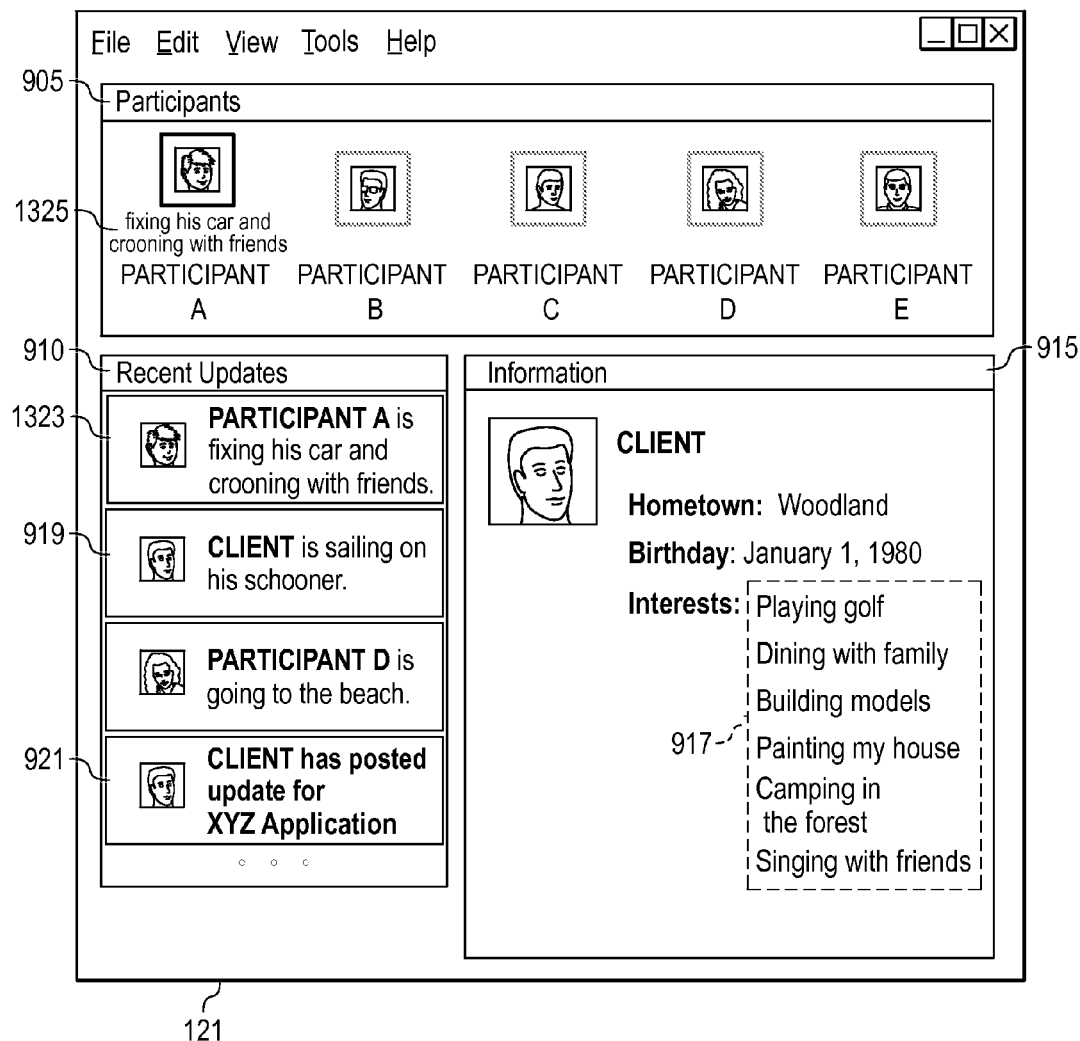
FIG. 13 illustrates a further example scenario of adjusting visibility level of a participant profile in the client social networking interface illustrated in FIG. 9, according to an embodiment.

FIG. 13 illustrates social networking interface 121 upon posting of a new activity stream update 1323 by Participant A. FIG. 13 illustrates a further example scenario in which prominence of the profile of Participant A is adjusted from the visibility level illustrated in FIG. 9 according to the method 200. More specifically, in this example scenario, relevancy score is calculated and adjusted for Participant A based on the content of the activity stream update 1323 according to the methods 600 and 700, and visibility level of the profile of Participant A is adjusted based on the calculated relevancy score according to the method 800.

For the example scenario of FIG. 13, it is assumed that the relevancy score is initialized to a baseline value of 0 according to step 605 of the method 600. According to step 610, client application 119 may facilitate parsing of language in activity stream update 1323 of Participant A to determine actionable tasks associated therewith. Specifically, client application 119 may send language in activity stream update 1323 to data parsing application 151, which may determine the following actionable tasks associated with activity stream update 1323: "fixing [action verb] car [object]" and "crooning [action verb] friends [object]". Data parsing application 151 may ignore insignificant articles, conjunctions, auxiliary verbs, pronouns, and prepositions.

Furthermore, according to step 615, client application 119 may facilitate parsing of language associated with the client to determine actionable tasks associated therewith. For purposes of this example, client application 119 may derive client language from interests 917 listed in client profile information 915 as well as the past two client activity stream updates 919 and 921. Client application 119 may send client language derived from interests 917 and client activity stream updates 919 and 921 to data parsing application 151, which may determine the following actionable tasks associated with the client: "sailing [action verb] schooner [object]", "playing [action verb] golf [object]", "dining [action verb] family [object]", "building [action verb] models [object]", "painting [action verb] house [object]", "camping [action verb] forest [object]", and "singing [action verb] friends [object]".

According to the example scenario of FIG. 13, adjustment of the relevancy score according to step 620 is assumed to occur via the method 700. According the method 700, each of the actionable tasks associated with activity stream update 1023 of Participant A may be iteratively compared with each of the actionable tasks associated with the client. As a result of iteratively comparing the actionable tasks associated with activity stream update 1323 and the actionable tasks associated with the client, at step 706 client application 119 may determine that no complete direct match relationship exists.

At step 710, client application 119 may determine that a partial direct match—partial synonymous relationship exists between actionable task "crooning friends" associated with activity stream update 1323 of Participant A and actionable task "singing friends" associated with the client. Specifically, upon consultation of language parsing application 151, client application 119 may determine that action verb "crooning" of the actionable task associated with activity stream update 1323 is synonymous with action verb "singing" of the actionable task associated with the client, and further may determine that the object "friends" associated with activity stream update 1323 is identical to the object "friends" associated with the client. Accordingly, at step 712 client application 119 may increase the relevancy score, which initially is equal to the baseline value of 0, by a second predefined amount. For purposes of this example, the second predefined amount for a partial direct match—partial synonymous relationship is assumed to be 15. Thus, the relevancy score is increased by 15, such that the relevancy score is adjusted to 15.

Furthermore, as a result of iterative comparison, at step 714 client application 119 may determine that no partial direct match—partial ontological relationship exists. At step 718, client application 119 may determine that no sole partial direct match relationship exists. At step 722, client application 119 may determine that no complete synonymous relationship exists. At step 726, client application 119 may determine that no partial synonymous—partial ontological relationship exists. At step 730, client application 119 may determine that no sole partial synonymous relationship exists. At step 734, client application 119 may determine that no complete ontological relationship exists.

At step 738, client application 119 may determine that a sole partial ontological relationship exists between actionable task "fixing car" associated with activity stream update 1323 of Participant A and actionable task "sailing schooner" associated with the client. Specifically, client application 119 may determine that no relationship exists between action verb "fixing" of the actionable task associated with activity stream update 1323 and action verb "sailing" of the actionable task associated with the client. However, client may determine that an ontological relationship exists between the object "car" of the actionable task associated with activity stream update 1323 and the object "schooner" of the actionable task associated with the client. Such ontological relationship may be determined by consulting ontology 161 including ontology tree 1100 as illustrated in FIG. 11. Accordingly, at step 740 client application 119 may increase the relevancy score by a ninth amount. For purposes of this example, magnitude of the ninth amount for a sole partial ontological relationship is assumed to be 3 for one degree of separation, 2 for two degrees of separation, and 1 for three degrees of separation. Client application 119 may determine three degrees of separation between the objects "car" and "schooner", as there are three branches in ontology tree 1100 between node 1115 representing category "car" and node 1125 representing category "schooner". Thus, at step 740 client application 119 may increase the relevancy score by a ninth amount of 1 based on the determined ontological relationship with three degrees of separation, such that the relevancy score is adjusted to 16.

Having calculated the relevancy score of 16 for Participant A according to the methods 600 and 700, client application 119 may adjust visibility level of the profile of Participant A within social networking interface 121 according to the method 800. For purposes of this example scenario, the first predefined threshold value according to the method 800 is assumed to be 10, and the second predefined threshold value is assumed to be 5. Moreover, for this example it is assumed that a participant profile is to be increased one visibility level or decreased one visibility level according to the method 800. Additionally, for this example it is assumed that adjusting visibility level of a participant profile entails increasing or decreasing border color intensity around the thumbnail image representing the participant in participant identification section 905.

For this example scenario, at step 805 client application 119 may determine that the calculated relevancy score of 16 for Participant A is greater than the first predefined value of 10. Thus, at step 810 client application 119 may increase the visibility level of the profile of Participant A one visibility level. Specifically, client application 119 may increase the degree of border color intensity around the thumbnail image of Participant A in participant identification section 905 to one degree higher than the current predefined degree. Illustratively, the border color intensity around the thumbnail image for Participant A in participant identification section 905 of FIG. 13 is increased to a degree assumed to be one degree higher than the border color intensity around the thumbnail image for Participant A in participant identification section 905 of FIG. 9. Thus, as illustrated in FIG. 13, the prominence of the profile of Participant A has been increased based on activity stream update 1323.

Furthermore, for purposes of this example, a predefined actionable task threshold value is assumed to be 12. Since the calculated relevancy score of 16 exceeds the actionable task threshold value, client application 119 may include a caption 1325 adjacent to the thumbnail image for Participant A in participant identification section 905. As illustrated in FIG. 13, caption 1325 includes natural language of activity stream update 1323 of Participant A. Accordingly, natural language including the actionable tasks associated with activity stream update 1323 is prominently displayed in participant identification section 905, reflecting the relatively high relevance of activity stream update 1323.

According to the various embodiments described herein, prominence of a profile of a participant in a social networking interface may be adjusted according to the relevance of an activity stream update of the participant. By adjusting a participant profile based on relevance of updates rather than mere timing or frequency of updates, a social networking interface may display material more consistent with client needs or preferences.

While the foregoing description is directed to various embodiments, such description is not intended to limit the scope of the invention. All kinds of modifications made to the described embodiments and equivalent arrangements should fall within the protected scope of the invention. Hence, the scope of the invention should be explained most widely according to the claims that follow in connection with the detailed description, and should cover all the possibly equivalent variations and equivalent arrangements. Accordingly, further embodiments may be devised without departing from the basic scope of the invention.

What is claimed is:

1. A method of adjusting prominence of a profile of a participant among a plurality of participants in a social networking interface of a client, the method comprising:
   receiving an activity stream update of the participant;
   calculating a relevancy score based on content in the activity stream update of the participant; and
   adjusting a visibility level of the profile of the participant in the social networking interface based upon the calculated relevancy score, wherein adjusting the visibility level of the profile of the participant comprises adjusting a visibility level of attributes of a border around a thumbnail image of the participant.

2. The method of claim 1, wherein calculating the relevancy score comprises:
   initializing the relevancy score with a predefined baseline value;
   facilitating parsing of language in the activity stream update of the participant to determine one or more terms associated with the activity stream update of the participant;
   facilitating parsing of language associated with the client to determine one or more terms associated with the client; and
   adjusting the relevancy score by iteratively comparing the one or more terms associated with the activity stream update of the participant and the one or more terms associated with the client.

3. The method of claim 2, wherein adjusting the relevancy score comprises:
   upon determining a direct match relationship between a term among the one or more terms associated with the activity stream update of the participant and a term among the one or more terms associated with the client, increasing the relevancy score by a first predefined amount;
   upon determining a synonymous relationship between a term among the one or more terms associated with the activity stream update of the participant and a term among the one or more terms associated with the client, increasing the relevancy score by a second predefined amount, wherein the second predefined amount is less than the first predefined amount; and
   upon determining an ontological relationship between a term among the one or more terms associated with the activity stream update of the participant and a term among the one or more terms associated with the client, increasing the relevancy score by a third amount, wherein the third amount is less than the second predefined amount, and wherein magnitude of the third amount is determined via ontological analysis.

4. The method of claim 3, wherein adjusting the relevancy score further comprises:
   upon determining no relationship between a term among the one or more terms associated with the activity stream update of the participant and a term among the one or more terms associated with the client, and upon further determining that the participant has posted a threshold number of activity stream updates within a predefined duration of time, decreasing the relevancy score by a fourth predefined amount.

5. The method of claim 1, wherein calculating the relevancy score comprises:
   initializing the relevancy score with a predefined baseline value;
   determining one or more content types associated with the activity stream update of the participant;

determining one or more content types associated with the client; and adjusting the relevancy score by iteratively comparing the one or more content types associated with the activity stream update of the participant and the one or more content types associated with the client.

6. The method of claim 5, wherein adjusting the relevancy score comprises:

upon determining a match between a content type among the one or more content types associated with the activity stream update of the participant and a content type among the one or more content types associated with the client, increasing the relevancy score by a predefined amount.

7. The method of claim 1, wherein calculating the relevancy score comprises:

initializing the relevancy score with a predefined baseline value;

facilitating parsing of language in the activity stream update of the participant to determine one or more actionable tasks associated with the activity stream update of the participant;

facilitating parsing of language associated with the client to determine one or more actionable tasks associated with the client; and adjusting the relevancy score by iteratively comparing the one or more actionable tasks associated with the activity stream update of the participant and the one or more actionable tasks associated with the client.

8. The method of claim 7, further comprising:

upon determining that the relevancy score exceeds an actionable task threshold value, including natural language of the activity stream update of the participant in a caption adjacent to a thumbnail image of the participant in the social networking interface.

9. The method of claim 1, wherein adjusting the visibility level of the profile of the participant comprises increasing the visibility level of the profile of the participant upon determining that the calculated relevancy score is greater than or equal to a first predefined threshold value.

10. The method of claim 9, wherein adjusting the visibility level of the profile of the participant further comprises decreasing the visibility level of the profile of the participant upon determining that the calculated relevancy score is less than a second predefined threshold value.

11. The method of claim 10, wherein the second predefined threshold value is equal to the first predefined threshold value.

12. The method of claim 1, wherein adjusting the visibility level of the profile of the participant further comprises adjusting a visibility level of the thumbnail image of the participant.

13. The method of claim 12, wherein adjusting the visibility level of the thumbnail image of the participant comprises adjusting size of the thumbnail image to a predefined size different from a current predefined size.

14. The method of claim 1, wherein adjusting the visibility level of attributes of the border around the thumbnail image of the participant comprises adjusting degree of border color intensity.

15. The method of claim 1, wherein adjusting the visibility level of attributes of the border around the thumbnail image of the participant comprises adjusting border size.

* * * * *